United States Patent
Stefanescu et al.

(10) Patent No.: US 10,132,705 B2
(45) Date of Patent: Nov. 20, 2018

(54) LOW-STRESS FLOATING-CHIP PRESSURE SENSORS

(71) Applicant: KULITE SEMICONDUCTOR PRODUCTS, INC., Leonia, NJ (US)

(72) Inventors: Sorin Stefanescu, New Milford, NJ (US); Alexander A. Ned, Kinnelon, NJ (US); Joseph R. VanDeWeert, Maywood, NJ (US); Andrew Bemis, Upper Saddle River, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 170 days.

(21) Appl. No.: 15/213,971

(22) Filed: Jul. 19, 2016

(65) Prior Publication Data
US 2018/0024020 A1    Jan. 25, 2018

(51) Int. Cl.
*G01L 9/00* (2006.01)
*G01L 9/06* (2006.01)
*G01L 19/04* (2006.01)

(52) U.S. Cl.
CPC .................................. *G01L 9/0054* (2013.01)

(58) Field of Classification Search
CPC ..... G01L 9/00; G01L 9/04; G01L 9/06; G01L 9/0042; G01L 9/0054; G01L 19/02; G01L 19/04; G01L 19/14; G01L 19/145; G01C 5/06
See application file for complete search history.

(56) References Cited

U.S. PATENT DOCUMENTS

| | | | |
|---|---|---|---|
| 6,821,822 B1 * | 11/2004 | Sato | H01L 21/565 438/127 |
| 7,749,797 B2 * | 7/2010 | Bauer | H01L 24/83 257/433 |
| 8,436,433 B1 | 5/2013 | Isebrand et al. | |
| 9,261,425 B2 | 2/2016 | Fahimi et al. | |
| 9,274,016 B2 | 3/2016 | Tokuda et al. | |
| 9,310,267 B2 | 4/2016 | Wagner et al. | |

(Continued)

FOREIGN PATENT DOCUMENTS

| DE | 102010042113 A1 * | 4/2012 | .......... B81B 7/0019 |
|---|---|---|---|
| EP | 0126989 A1 * | 12/1984 | ......... G01L 19/0038 |
| JP | 02196938 A * | 8/1990 | ............... G01L 9/04 |

*Primary Examiner* — Nguyen Ha
(74) *Attorney, Agent, or Firm* — Troutman Sanders LLP; James E. Schutz; Mark Lehi Jones

(57) ABSTRACT

Systems and methods are disclosed for a pressure sensor device. The pressure sensor device includes a header that defines an interior cavity including one or more tether connecting regions. The header further defines an outer portion in communication with the interior cavity; the outer portion includes a plurality of through bores in communication with an exterior portion of the header for insertion of header pins through the header. The pressure sensor device includes a pressure sensor chip disposed within the interior cavity of the header. One or more anchoring tethers are attached to the corresponding one or more tether connecting regions. The pressure sensor chip is free to move within the interior cavity of the header, and the one or more anchoring tethers are in communication with the pressure sensor chip and are configured to limit movement of the pressure sensor chip within the header.

20 Claims, 28 Drawing Sheets

(56) References Cited

U.S. PATENT DOCUMENTS

| | | |
|---|---|---|
| 9,316,552 B2 | 4/2016 | Wagner et al. |
| 9,324,586 B2 * | 4/2016 | Theuss .................. H01L 21/565 |
| 9,446,944 B2 * | 9/2016 | Ernst ..................... B81B 7/0048 |
| 2007/0069354 A1 * | 3/2007 | Dangelmaier ........ B81B 7/0058 257/678 |
| 2014/0007649 A1 * | 1/2014 | Niemann ............... G01N 27/12 73/23.2 |
| 2015/0048461 A1 * | 2/2015 | Mayer ................. G01L 19/0069 257/415 |
| 2015/0090041 A1 * | 4/2015 | Imai ........................ G01L 19/06 73/723 |
| 2015/0114129 A1 * | 4/2015 | Chen ..................... G01L 9/0052 73/721 |
| 2015/0369681 A1 * | 12/2015 | Imai ........................ G01C 5/06 73/727 |
| 2015/0369682 A1 * | 12/2015 | Nakajima ............... G01L 9/065 73/384 |
| 2017/0018471 A1 * | 1/2017 | Aono .................. G01C 19/5783 |
| 2017/0250118 A1 * | 8/2017 | Yotsuya .............. G01L 19/0654 |

\* cited by examiner

LOW-STRESS FLOATING-CHIP PRESSURE SENSORS

FIELD

The disclosed technology relates to pressure transducers, and more particularly to pressure sensor chip structures and techniques of installation to reduce mounting-related and thermal-related stresses on the chip.

BACKGROUND

Certain pressure sensing applications utilize semiconductor transducer chips that can be packaged in a header assembly to facilitate connecting the sensor assembly to a pressure port, manifold, or other interface for which pressure of a media is to be measured.

A standard method for installing a pressure transducer chip in a header/housing assembly is by adhesive bonding. In some applications, a relatively hard epoxy-type adhesive can secure the chip to the housing. In other applications, a relatively soft rubber or silicon-type adhesive can be utilized to secure the chip. In certain applications, such as in high-temperature environments, the chip can be secured using glass frit bonding. The use of such adhesives and/or bonding can enable assembly and packaging using standard high-volume semiconductor packaging techniques, which can include automated adhesive dispensing, glass frit dispensing, chip pick-and-place, and wire bonding/welding for making electrical interconnections between the sensor chip and the transducer header.

FIGS. 1-3 depict conventional sensor assemblies 100 in which a pressure sensor chip is bonded to a header of the sensor enclosure by an adhesive or a glass bond. FIG. 1, for example, depicts a cross sectional side-view of a conventional enclosed and oil-filled sensor assembly 100 having a sensor chip bonded to the header. FIG. 2 depicts a cross sectional side-view of a similar sensor assembly 200 having a sensor chip bonded to the header. In this conventional assembly 200, the bottom portion of the sensor chip is bonded to a header of the sensor enclosure by an adhesive or a glass bond, while the sensor enclosure is open such that a top portion of the sensor chip can be exposed to the local gas or fluid environment. FIG. 3 is an isometric representation of the sensor assembly 200, as depicted in and discussed with reference to FIG. 2.

While allowing for high volume manufacturing, the use of adhesive or glass frit bonding of the sensor chip to the transducer housing can introduce a source of measurement error through the various built-in, transferred, and/or temperature-related stresses. For example, static and/or dynamic stress can be transferred to the transducer chip directly from the adhesive (or glass frit) layer and/or from dimensional changes in the housing due to external pressure or thermal expansion of the various housing components and mounting layers.

A need still exists for sensor systems and methods in which a transducer chip can be secured within a housing while avoiding certain stress-related measurement errors that can happen with traditional mounting techniques.

BRIEF SUMMARY

Some or all of the above needs may be addressed by certain implementations of the disclosed technology. Certain implementations of the disclosed technology may include systems and methods for a pressure sensor device.

A pressure sensor device is disclosed that includes a header that defines an interior cavity including one or more tether connecting regions. The header further defines an outer portion in communication with the interior cavity. The outer portion includes a plurality of through bores in communication with an exterior portion of the header for insertion of header pins through the header. The pressure sensor device includes a pressure sensor chip disposed within the interior cavity of the header. One or more anchoring tethers may be attached to the corresponding one or more tether connecting regions. The pressure sensor chip can be free to move within the interior cavity of the header, and the one or more anchoring tethers are in communication with the pressure sensor chip and are configured to limit movement of the pressure sensor chip within the header.

In another example implementation, a method is disclosed. The method includes inserting a pressure sensor chip within a housing that includes a header, such that the pressure sensor chip is free to move within an interior cavity of the header. The header includes an interior cavity having one or more tether connecting regions; an outer portion in communication with the interior cavity, the outer portion including a plurality of through bores; and an exterior portion. The method includes attaching one or more anchoring tethers to the corresponding one or more tether connecting regions of the header. The one or more anchoring tethers are in communication with the pressure sensor chip and are configured to limit movement of the pressure sensor chip within the header.

Other implementations, features, and aspects of the disclosed technology are described in detail herein and are considered a part of the claimed disclosed technology. Other implementations, features, and aspects can be understood with reference to the following detailed description, accompanying drawings, and claims.

DETAILED DESCRIPTION

Certain example implementations of the disclosed technology can include devices and techniques for securing pressure sensor chips within respective housings without any direct or rigid adhesives or bonding of the sensor chip substrate to the housing. In accordance with an example implementation of the disclosed technology, the pressure sensor chip may be free to move within the housing, with its movement limited only by flexible wire electrical interconnections, anchoring tethers, and/or mechanical stops.

Some implementations of the disclosed technology will be described more fully hereinafter with reference to the accompanying drawings. This disclosed technology may however, be embodied in many different forms and should not be construed as limited to the implementations set forth herein.

Figure 1:
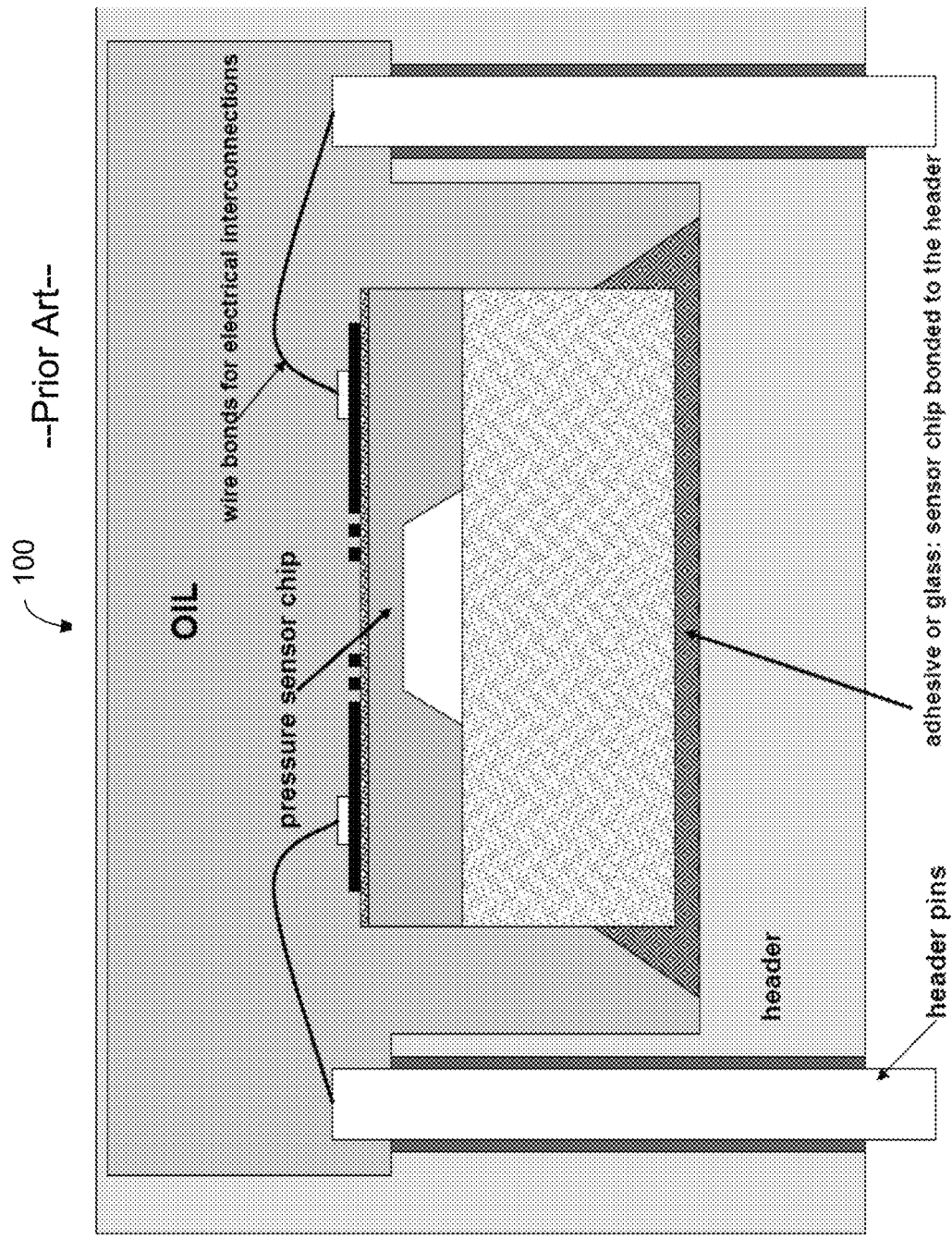
FIG. 1 depicts a cross sectional side-view of a conventional enclosed and oil-filled sensor assembly 100 having a sensor chip bonded to the header.
Figure 2:
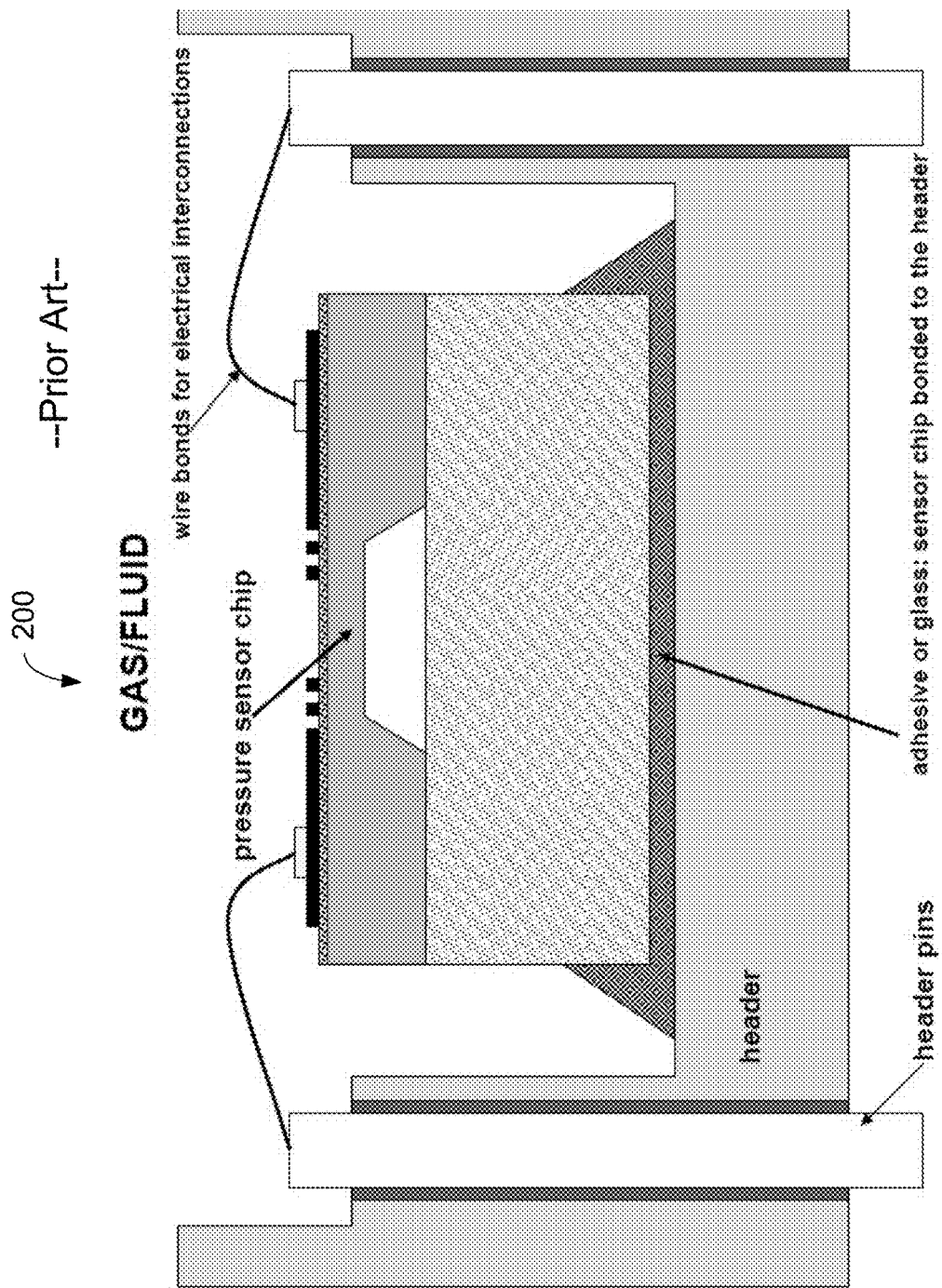
FIG. 2 depicts a cross sectional side-view of a conventional exposed sensor assembly 200 having a sensor chip bonded to the header
Figure 3:
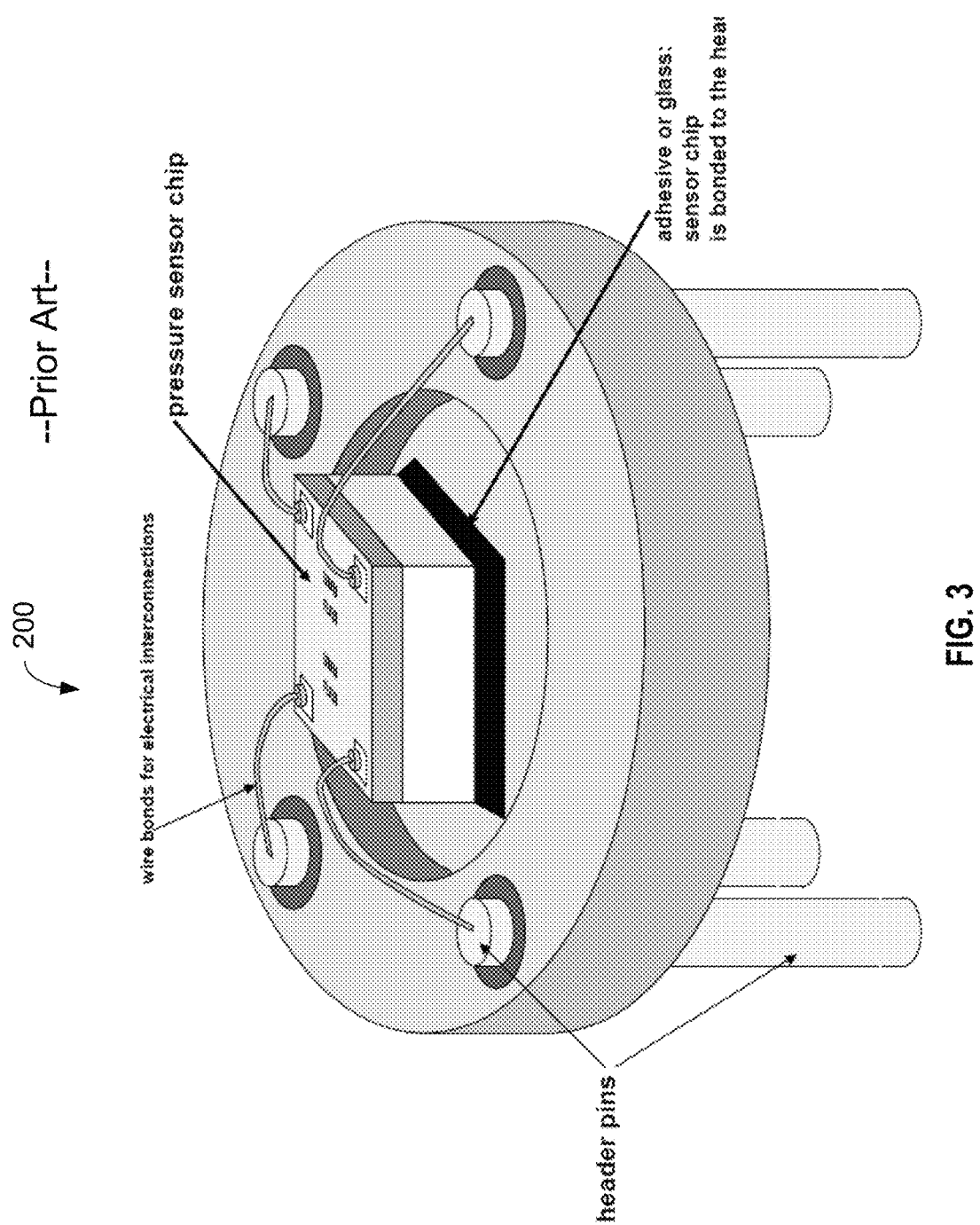
FIG. 3 is an isometric representation of the sensor assembly 200, as depicted in and discussed with reference to FIG. 2.

Certain conventional pressure sensor assemblies, such as discussed above and depicted in FIGS. 1-3 can include sensor chips that are mechanically attached and bonded to the transducer header or similar enclosure component using adhesives, glass frit bonding, etc. Such mechanical coupling to the package can introduce a source of measurement error through the various built-in, transferred, and/or temperature-related stresses.

Figure 4:
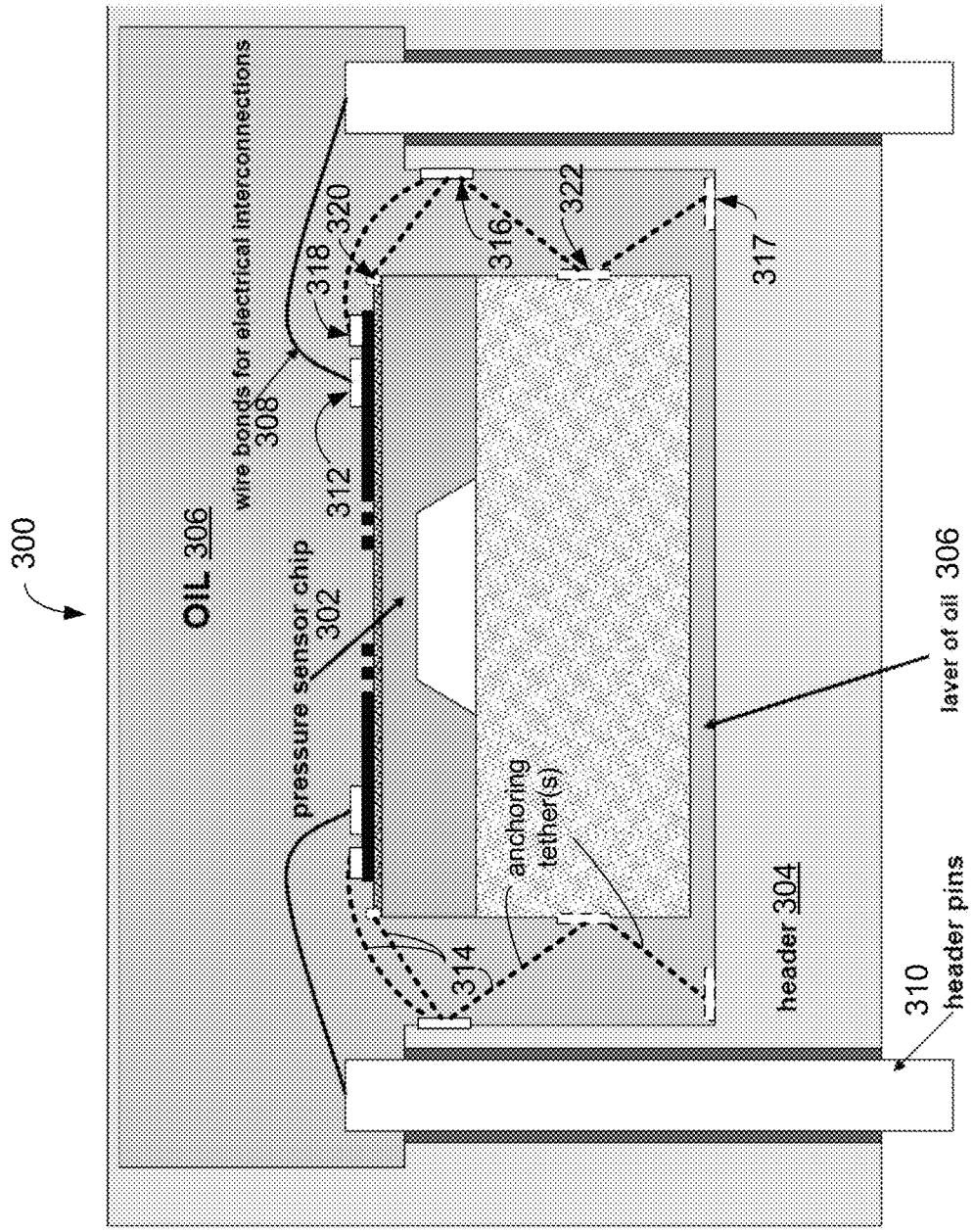
FIG. 4 depicts a cross sectional side-view of an enclosed and oil-filled sensor assembly 300, according to an example implementation of the disclosed technology.

FIG. 4 depicts a cross sectional side-view of an oil-filled sensor assembly 300, according to an example implementation of the disclosed technology. Some of the similar features and methods as utilized and described with respect to this example implementation may also be utilized in one or more of the example implementations as discussed with respect to FIGS. 5-27. In an example implementation, and with continued reference to FIG. 4, a sensor chip 302 may be tethered to the pressure transducer header 304 only through the wire bonded electrical interconnections 308 and/or anchoring tethers 314, and without any direct mechanical attachment, direct coupling, adhesive, or glass bonding of the sensor chip 302 to the header 304. In this example implementation, the sensor assembly may include an enclosure or cavity that is filled with oil 306.

In certain example implementations, the sensor chip 302 may be installed within the inner cavity, which may be at least partially defined by the header 304. In an example implementation, one end of flexible wire electrical interconnections 308 may be welded, bonded, and/or electrically and mechanically attached to the respective header pins 310, while the other end of the flexible wire electrical interconnections 308 may be welded, bonded, and/or electrically and mechanically attached to the respective interconnection pads 312 on the sensor chip 302, thus providing signal and/or power connections to/from the header pins 310 and to/from the circuitry on the sensor chip 302.

In accordance with certain example implementations, the wires used for the wire bonded electrical interconnections 308 between the pressure sensor chip and the pressure transducer header may include one or more of gold (Au), aluminum (Al), platinum (Pt), copper (Cu), silver (Ag), palladium (Pd), magnesium (Mg), beryllium (Be), and/or other appropriate metal or metal alloy.

In accordance with certain example implementations of the disclosed technology, one or more anchoring tethers 314 may be utilized to at least partially restrict the movement of the sensor chip 302 within the cavity. In some implementations, the anchoring tethers 314 may be used in conjunction with the flexible wire electrical interconnections 308 to restrict the movement of the sensor chip 302. According to certain example implementations of the disclosed technology, the anchoring tethers 314 may be utilized to restrict the movement of the sensor chip 302 such that it remains in a "floating" position within the cavity. Such restriction of movement of the sensor chip by the anchoring tethers 314 may be utilized to reduce or eliminate contact of the sensor chip 302 with the interior walls of the header cavity. In certain implementations, the restriction of movement of the sensor chip by the anchoring tethers 314 may also be utilized to limit the bending of the wire electrical interconnections 308, for example, to reduce bending fatigue failures.

In certain example implementations, the anchoring tethers 314 may be made of a material that is the same or similar to the flexible wire electrical interconnections 308, for example, so that standard microelectronics wire bonding techniques may be utilized, similar to the techniques that may be used for installing the flexible wire electrical interconnections 308. However, in certain example implementations, the anchoring tethers may employ low- or non-conducting material to avoid unwanted conduction paths from the header body to the chip body.

As shown by the dashed lines in FIG. 4, the anchoring tethers 314 may be secured from inside the cavity of the header 304 to the sensor chip 302 using several optional configurations. FIG. 4 shows two optional example implementations for the placement of a first connection region in contact within the cavity of the header 304. For example, a first connection region 316 may be established on an inner wall of the header cavity and may serve as a bonding point for the one or more anchoring tethers 314. In another example implementation or optional configuration, a first connection region 317 may be established on a bottom inner portion of the header cavity to serve as a bonding point for the one or more anchoring tethers 314. In one example implementation, the first connection region(s) 316 317 may include (a) contact pad(s), similar to the interconnection pads 312 on the sensor chip 302. In another example implementation, the first connection region(s) 316 317 may define an area within the header cavity where the anchoring tethers 314 are attached using adhesive.

FIG. 4 shows three optional example implementations for the placement of a second connection region: i.e., a second connection region 318 on a top surface of the sensor chip 302 (similar to the interconnection pads 312 on the sensor chip 302); a second connection region 320 near or at the edge of the diaphragm layer of the sensor chip 302; and a second connection region 322 on a side of the substrate region of the sensor chip 302. Certain example implementations may utilize one or more of these second connection regions to secure the sensor chip 302 within the housing. As may be readily apparent, the anchoring tethers 314 and/or the electrical interconnections 308 may be configured to reduce, minimize, or avoid transmitting stresses to the sensor chip 302, and to enable the sensor chip 302 to move with respect to the pressure transducer header 304.

Figure 5:
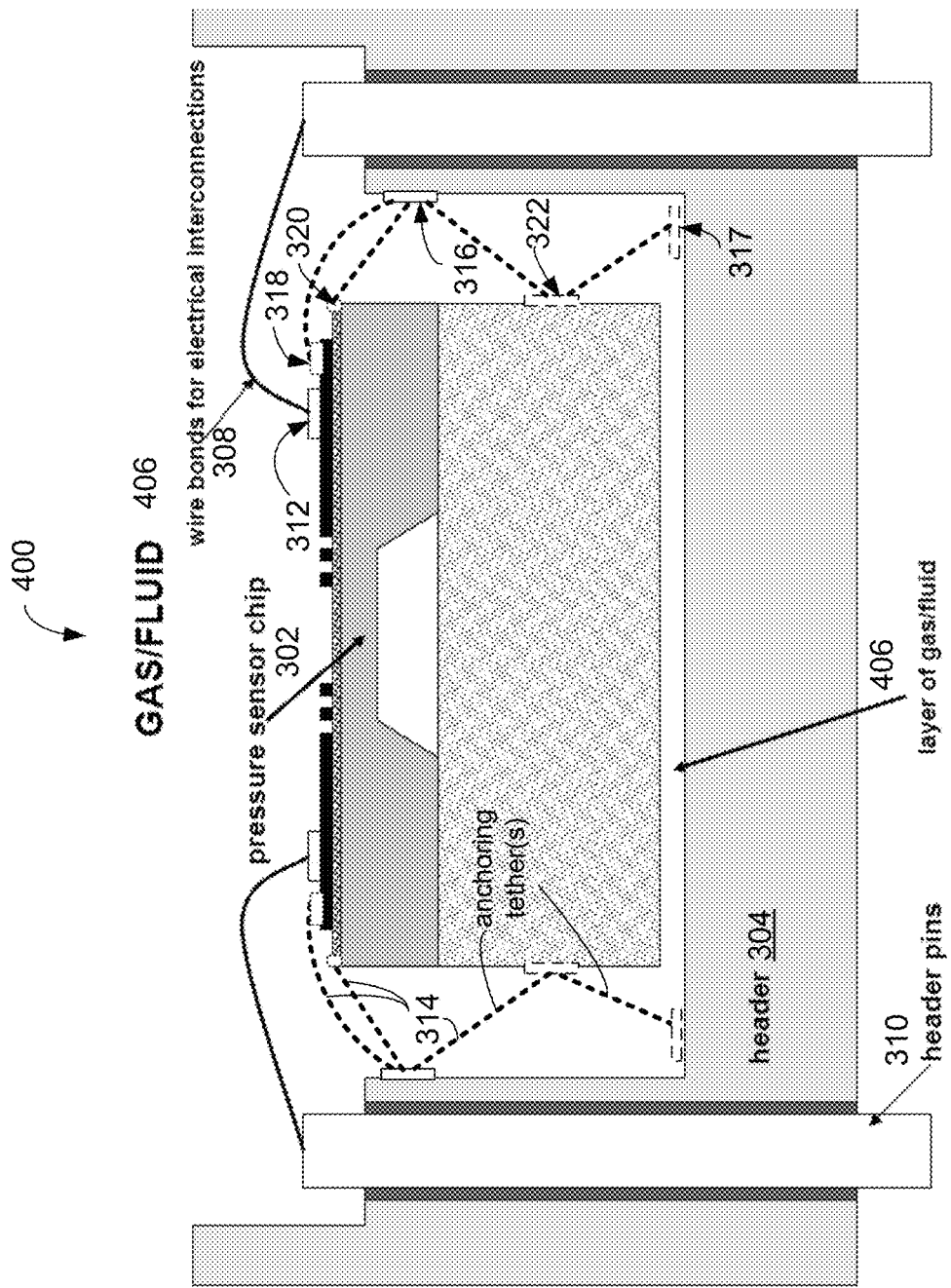
FIG. 5 depicts a cross sectional side-view of an exposed sensor assembly 400, according to an example implementation of the disclosed technology.

FIG. 5 depicts a cross sectional side-view of an exposed sensor assembly 400, according to an example implementation of the disclosed technology. As discussed above with reference to FIG. 4, a sensor chip 302 may be tethered to the pressure transducer header 304 only through the wire bonded electrical interconnections 308 and/or anchoring tethers 314, and without any direct mechanical attachment, direct coupling, adhesive, or glass bonding of the sensor chip 302 to the header 304. In this example implementation, the sensor assembly may include a header 304 that at least partially defines an open cavity that may be filled with a gas or fluid 406. For example, in certain embodiments, the sensor chip 302 may be directly exposed to the media for which pressure is to be measured. Otherwise, all of the pads, anchoring tethers, header pins, etc., may be the same or similar as discussed above with respect to FIG. 4, and will not be repeated here for the sake of brevity.

Figure 6:
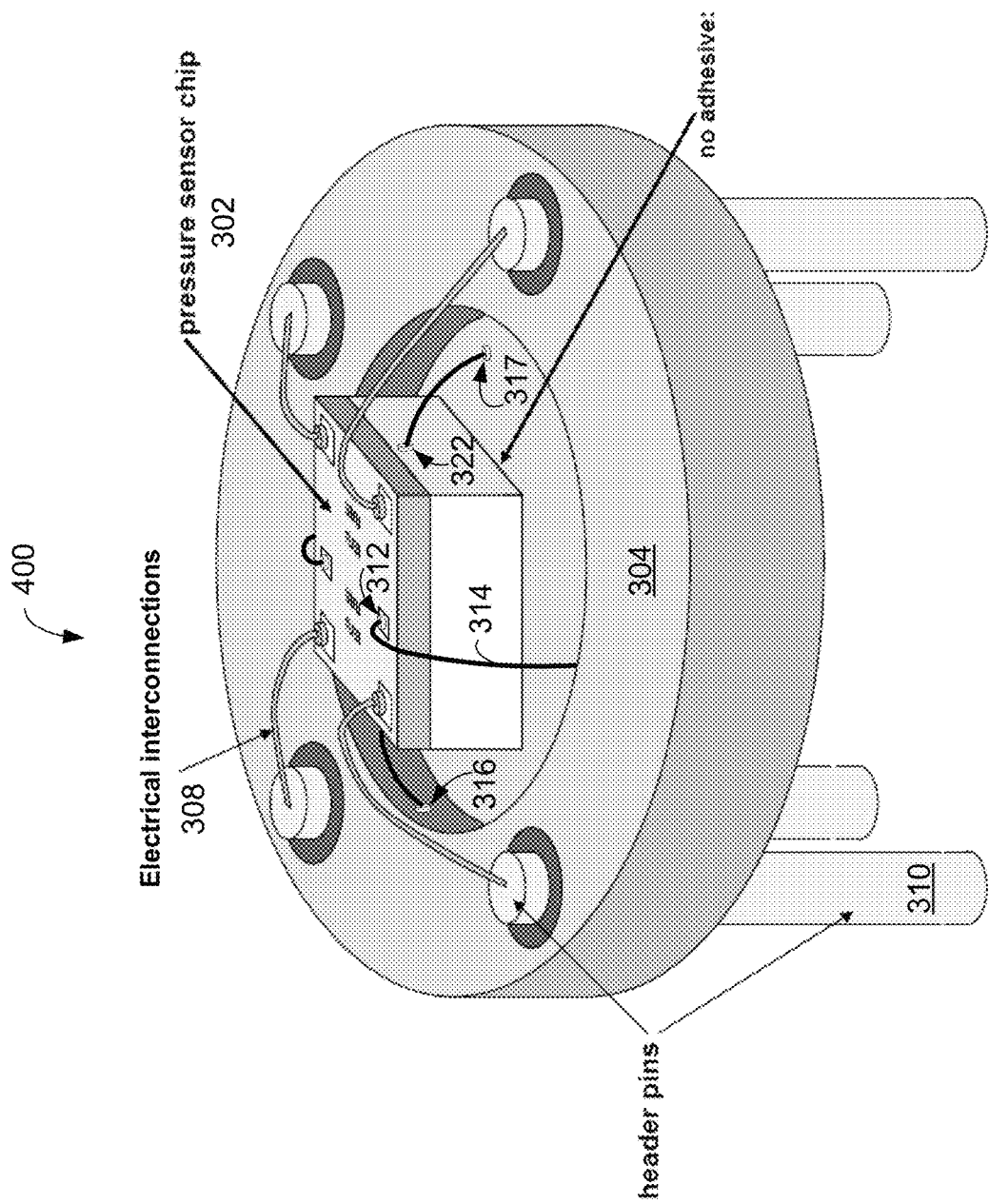
FIG. 6 is an isometric representation of the sensor assembly 400, as depicted in and discussed with reference to FIG. 5, with certain features as discussed with reference to FIG. 4.

FIG. 6 is an isometric representation of the sensor assembly 400, depicting some of the anchoring tethers and attachment features as discussed with reference to FIGS. 4 and 5. For example, FIG. 6 depicts four anchoring tethers 314 connecting various connection regions 312 322 on the sensor chip 302 to corresponding connection regions 316 317 within the cavity of the header 304. Certain example implementations may include tethering the sensor chip 302 to the header cavity using one or more of the anchoring tethers 314 with a length of each of the tethers 314 configured as needed to provide the required restriction of movement and/or rotation of the sensor chip 302 within the header cavity. For example, certain embodiments may utilize one or more anchoring tethers 314 to restrict rotation of the sensor chip 302 so that the electrical interconnections 308 do not cross each other and short out. In certain example implementations, two or more anchoring tethers 314 may be utilized to restrict a tilt of the sensor chip 302 within the header.

As may be appreciated, and as discussed above with reference to FIG. 4, the anchoring tethers 314 (shown in dashed lines to represent the various options for placement) may be configured and attached to the sensor chip 302 and an inner wall of the cavity of the header 304 at various positions, as shown. For example, some implementations may utilize the bonding pad 312 connections on the top of the sensor chip 302 for attachment of the tether(s) 314, while other implementations may bond one or more of the tethers 314 to the side of the sensor chip 302. Yet in other example implementations (as depicted in FIG. 6), a combination of the tether 314 placements may be employed.

Figure 7:
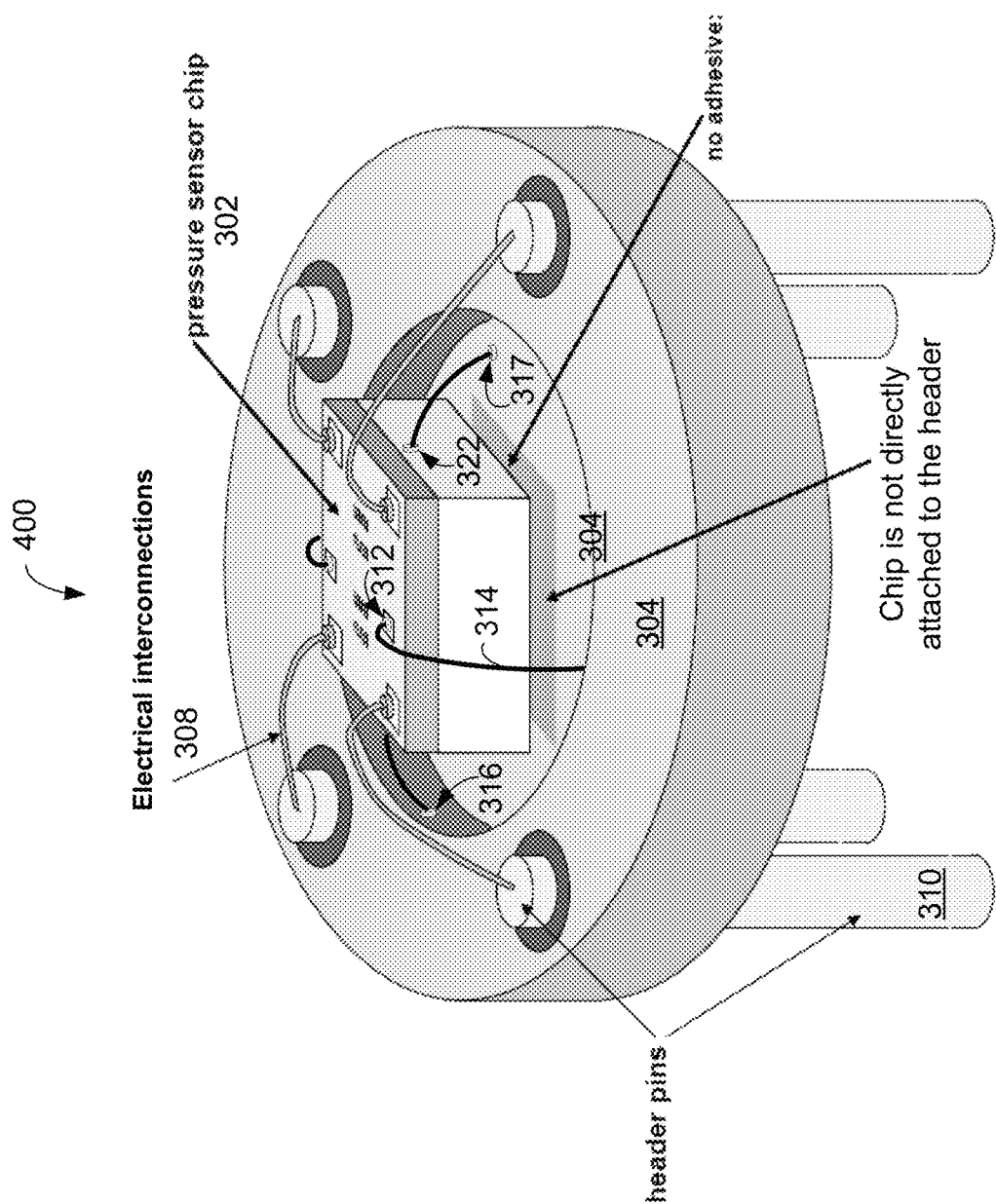
FIG. 7 is another isometric representation of the sensor assembly 400, as depicted in and discussed with reference to FIG. 6.

FIG. 7 is another isometric representation of the sensor assembly 400, as depicted in and discussed with reference to FIG. 6, and explicitly depicting that the sensor chip 302 is not directly attached, bonded, welded, etc., to the header; but instead, is secured only by the electrical interconnections 308 and the anchoring tethers 314.

According to an example implementation of the disclosed technology, the pressure sensor chip 302, anchoring tethers 314, and technique of installation in the pressure transducer header 304 (as shown in FIGS. 4-7 and as discussed herein) may provide pressure measurements of increased accuracy and stability, free from errors due to stresses and/or temperature induced stress variations that may be caused from rigid mounting and/or transferred from the header 304.

In certain example implementations, the use of anchoring tethers 314 may enable use of the pressure sensor chip 302 in commercial applications, including environments that may expose the sensor to high levels of vibration and/or acceleration. In certain example implementations, the anchoring tethers 314 may provide the additional technical benefit of restricting the sensor chip 302 movement, tilt, and/or rotation so that the wire bonded electrical interconnections 308 do not become entangled and electrically shorted, and/or so that metallic parts of the sensor chip 302 and/or the electrical interconnections 308 do not touch the pressure transducer header. In addition, the anchoring tethers 314 may help provide stress-relief for the wire bonded interconnections 308, for example, so that they don't fail due to sudden pressure variations and/or movement in high acceleration or high vibration measurement environments.

FIGS. 8-26 depict various pressure sensor chip structures and techniques of installation in the pressure transducer headers that may allow the pressure sensor chip to move freely with respect to the transducer header, but with the movement travel limited by various mechanical stops. According to various example implementations of the disclosed technology, one or more of the anchoring tethers 314 (as discussed above with reference to FIGS. 4-7) may be utilized with one or more of the various connection regions 312 322 316 317 in addition to or in conjunction with the mechanical stops, as will be discussed above with FIGS. 8-26.

In certain example implementations, the pressure transducers disclosed herein may be highly accurate and stable because of the reduction or absence of errors due to mounting stresses, transmitted stresses, and/or temperature-induced stress variations, and may be suitable for a wide variety of pressure measurement applications in environments including in high acceleration, or high vibration environments. This technical benefit may be due to limiting the movement of the sensor chip inside the pressure transducer header, for example, by the various anchoring tethers and/or mechanical stops included in the structures of the devices. In certain example implementations, the mechanical stops can include header inserts to restrict the movement of the sensor chip inside the transducer header. In certain example implementations, the mechanical stops and/or header inserts may be attached to the header using adhesives, glass frit bonding, friction fit, or other appropriate methods.

Figure 8:
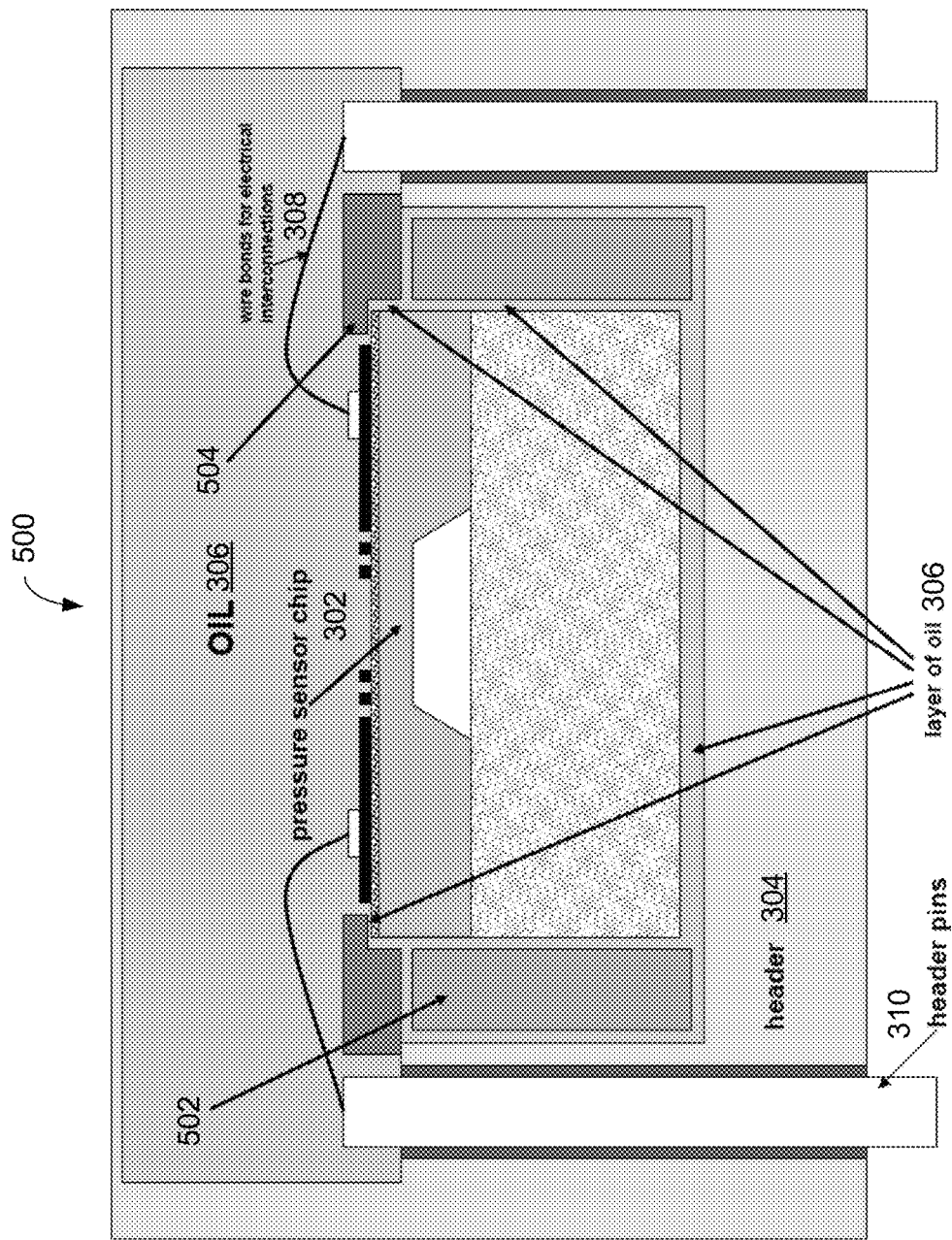
FIG. 8 depicts a cross sectional side-view of an enclosed and oil-filled sensor assembly 500, according to an example implementation of the disclosed technology.

FIG. 8 depicts a cross sectional side-view of an enclosed oil-filled sensor assembly 500, according to an example implementation of the disclosed technology. In this example implementation, one or more header inserts 502 504 may be utilized to restrict the movement of the pressure sensor chip 302. As discussed above with reference to FIG. 4, the sensor chip 302 may be floating inside the pressure transducer header 304, and the sensor chip 302 is not attached to the header through any adhesive layer, glass layer, or any other bonding between the bottom of the chip 302 and the header 304. In this example assembly 500, the pressure sensor chip 302 may be installed in the pressure transducer header 304 and can move freely with respect to the header 304, with its free movement limited only by wire bond interconnections 308, one or more anchoring tethers (not shown in FIG. 8, but as discussed above with reference to FIGS. 4-7) and/or by mechanical stops, which may include one or more header inserts 502 504.

In certain example implementations, the one or more header inserts 502 504 may be installed to provide electrical isolation of the wire bond interconnections 308 between the sensor chip 302 and header 304 during operation. For example, in oil-filled pressure transducer applications, the pressure sensor chip 302 may be floating and moving in the oil 306. In an example implementation, a gap may be defined around the sensor chip 302 and may be filled with a layer of oil 306 between the sensor chip 302 and the header 304. According to an example implementation of the disclosed technology, one or more of the header inserts 502 504 may be installed within the assembly 500 to limit lateral, rotational, and/or vertical movement travel. In certain example implementations, the header inserts 502 504 may be made of glass, ceramic type materials, polymer-based materials, or other suitable materials.

For the device structure shown in FIGS. 8-13, the electrical interconnections 308 between the sensor chip 302 and the header 304 may be made using wire bonding after installing the header inserts 502 504, which may provide movement inhibitors, limiters, or stoppers for the sensor chip 302. As shown in FIG. 8, the transducer assembly 500 may include header inserts 502 504 that are not overlapping with or touching the pressure-sensitive diaphragm or the piezoresistors of the sensor chip 302.

Figure 9:
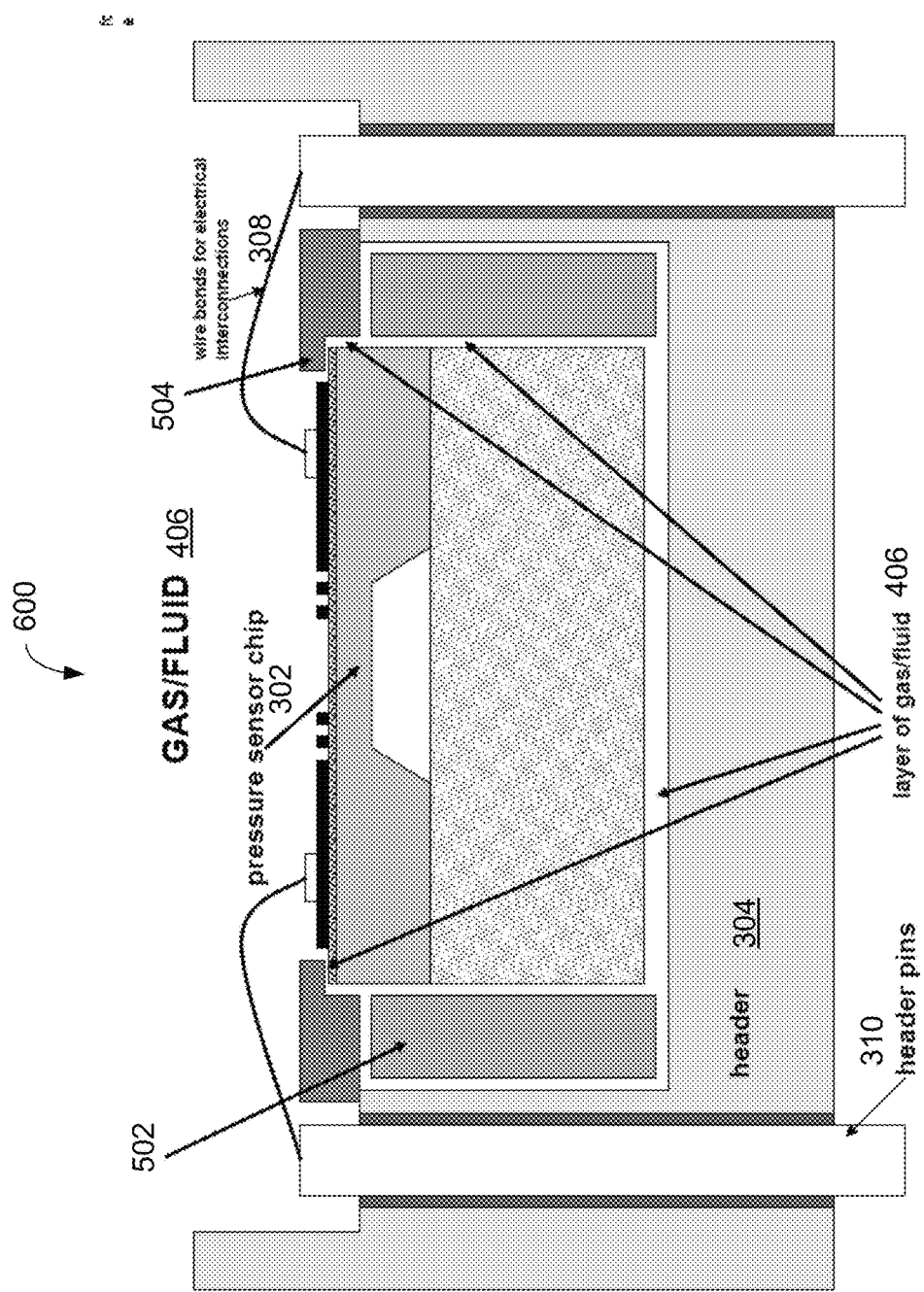
FIG. 9 depicts a cross sectional side-view of an exposed sensor assembly 600 without oil filling, according to an example implementation of the disclosed technology.

FIG. 9 depicts a cross sectional side-view of an open sensor assembly 600, without oil filling, according to an example implementation of the disclosed technology. The sensor assembly 600 is similar in configuration to the sensor assembly 400 as shown and discussed above with reference to FIG. 5, but FIG. 9 illustrates the addition of one or more header inserts 502 504, which may provide movement inhibitors, limiters, or stoppers for the sensor chip 302. Again, as discussed with reference to FIG. 8, in one implementation, the one or more anchoring tethers (not shown in FIG. 9, but as discussed above with reference to FIGS. 4-7) may be utilized in conjunction with the one or more header inserts 502 504.

According to an example implementation of the disclosed technology, and with reference to FIGS. 8 and 9, a first header insert 502 may be installed within a gap between the header 304 and the sensor chip 302, for example, to limit rotational and/or lateral movement of the sensor chip 302 within the header 304. In an example implementation, the first header insert 502 may be attached to the header 304 using an adhesive. Similarly, in an example implementation, a second header insert 504 may be placed above the sensor chip 302 to limit or stop the sensor chip movement in a vertical direction with respect to the header 304. In certain example implementations, the second header insert 504 may be attached to the header 304 using an adhesive.

Figure 10:
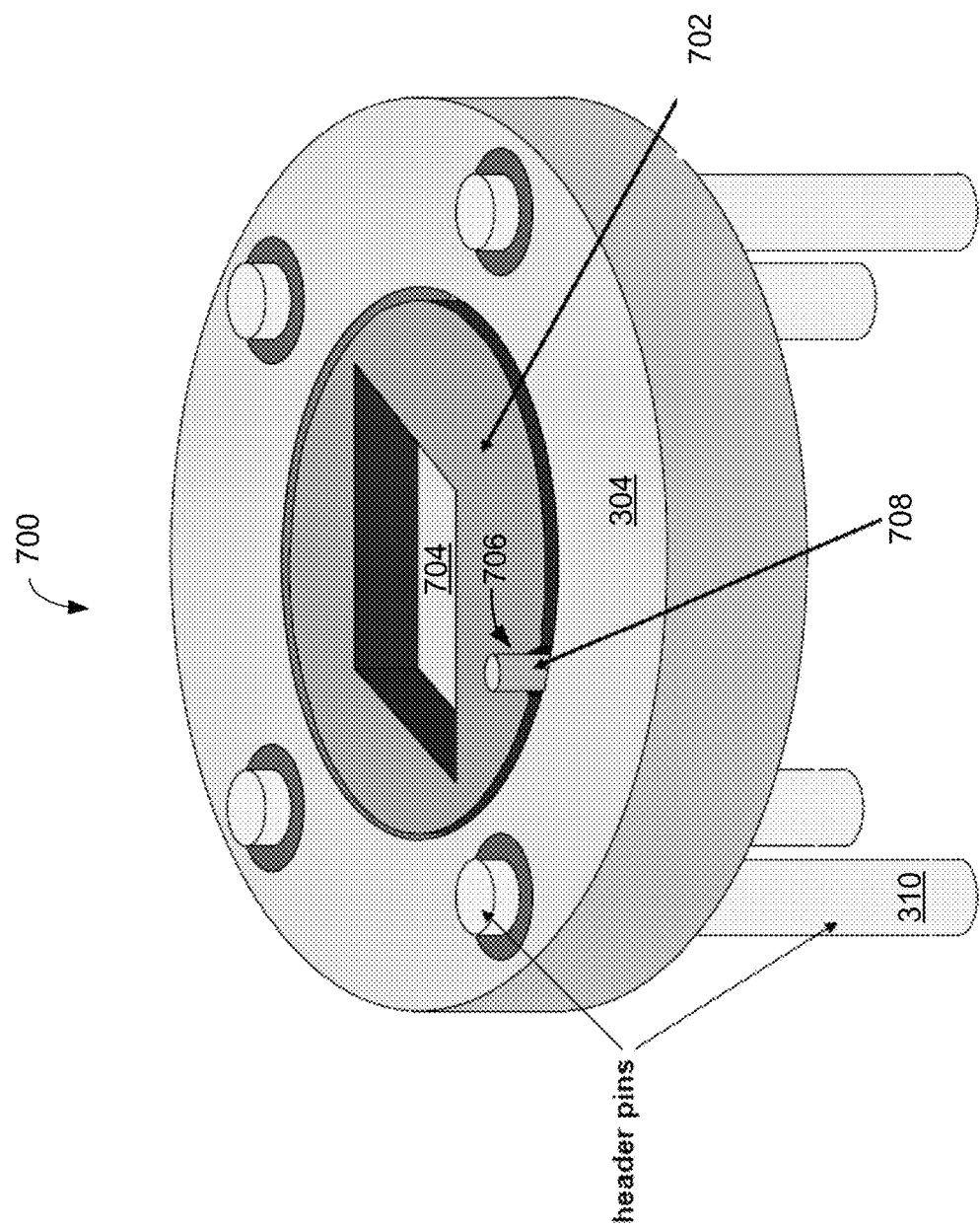
FIG. 10 is an isometric representation of a partial sensor assembly 700 implementation, according to an example embodiment of the disclosed technology.

FIG. 10 is an isometric representation of a partial sensor assembly 700 implementation, according to an example embodiment of the disclosed technology. As depicted, the assembly 700 may include a first header insert 702 with an aperture 704 to allow exposure of an inserted sensor chip (not shown) to a measurement media. According to certain example implementations of the disclosed technology, the aperture 704 of the first header insert 702 may be square or rectangular, and may define a cross sectional shape that can include a void area slightly larger than the dimensions of a sensor chip and suitable to allow movement of the inserted sensor chip within the void. In certain example implementations, the first header insert 702 may be attached to the header 304 using an adhesive.

According to an example implementation of the disclosed technology, and as depicted in FIG. 10, the first header insert 702 may include a notch 706 for interfacing with a pin 708 that may limit or stop rotation of the first header insert 702 within the body of the header 304. In certain example implementations, the pin 708 may be attached to the header.

Figure 11:
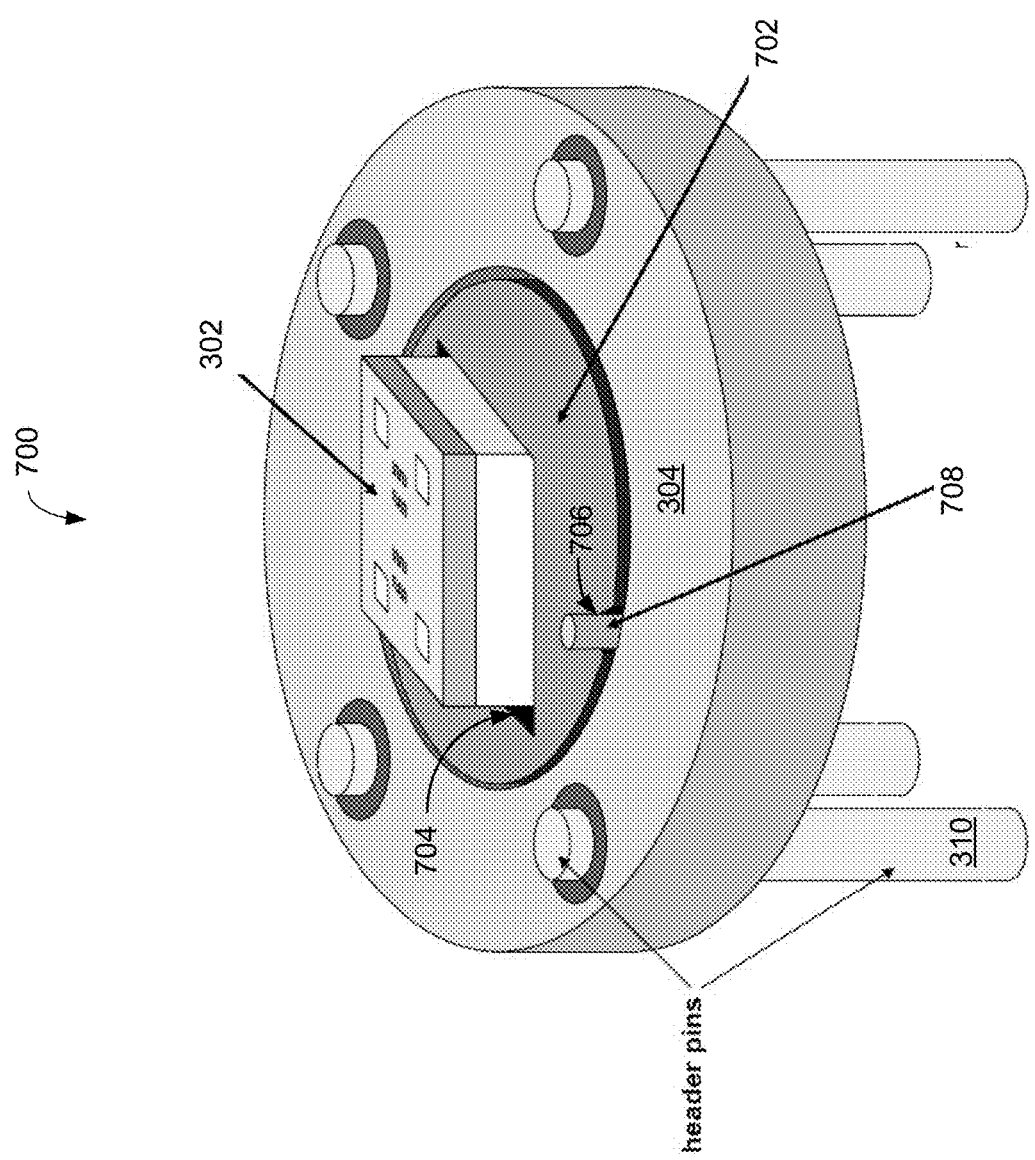
FIG. 11 is another isometric representation of the sensor assembly 700 implementation, showing a sensor chip 302 placement within the insert 702, and according to an example embodiment of the disclosed technology.

FIG. 11 is another isometric representation of the sensor assembly 700 implementation, as discussed with respect to FIG. 10, and including a sensor chip 302 placed within the first header insert 702, according to an example embodiment of the disclosed technology.

As depicted, the assembly 700 may include a first header insert 702 with an aperture 704 to allow exposure of an inserted sensor chip (not shown) to a measurement media. According to certain example implementations of the disclosed technology, the aperture 704 of the first header insert 702 may be square or rectangular, and may define a cross sectional shape that can include a void area slightly larger than the dimensions of a sensor chip and suitable to allow movement of the inserted sensor chip within the void. In certain example implementations, the first header insert 702 may be attached to the header 304 using an adhesive.

According to an example implementation of the disclosed technology, and as depicted in FIG. 10, the first header insert 702 may include a notch 706 for interfacing with a pin 708 that may limit or stop rotation of the first header insert 702 within the body of the header 304. In certain example implementations, the pin 708 may be attached to the header 304.

Figure 12:
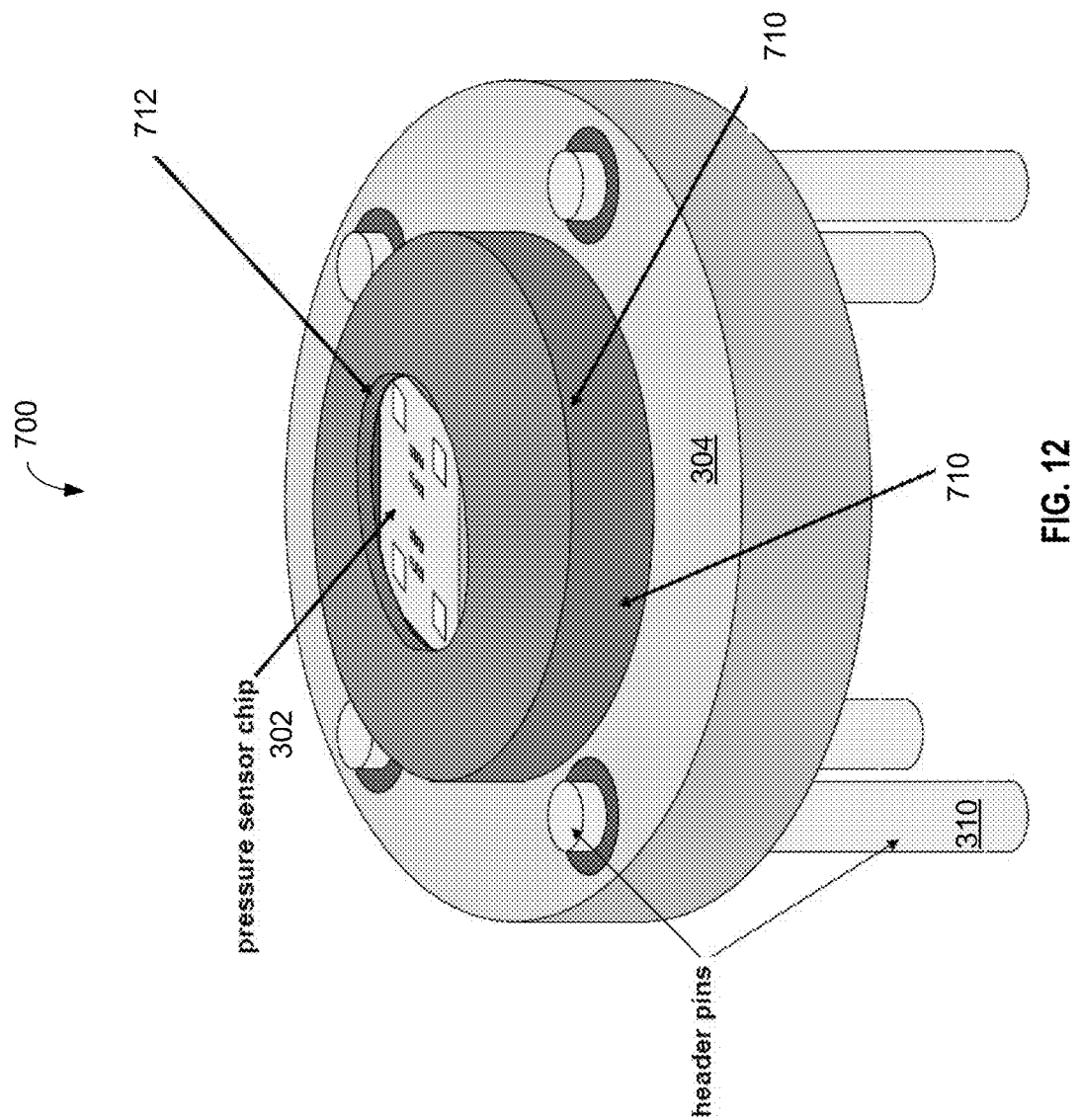
FIG. 12 is another isometric representation of the sensor assembly 700 implementation, as discussed with respect to FIGS. 10 and 11, including a second header insert 710 placed over the sensor chip 302.

FIG. 12 is another isometric representation of the sensor assembly 700 implementation, as discussed with respect to FIGS. 10 and 11, which may include a second header insert 710 placed over the sensor chip 302. The sensor chip 302 may be placed within the first header insert (such as the first header insert 702 as shown in FIG. 11). In accordance with an example implementation of the disclosed technology, the second header insert 710 may be placed above the sensor chip 302 to limit or stop the sensor chip 302 movement in the vertical direction. In certain example implementations, the second header insert 710 may be attached to the header 304 using an adhesive. In accordance with an example implementation of the disclosed technology, the second header insert 710 may include a circular, oval, square, rectangular, etc., aperture 712 to expose the sensor chip 302 to the measurement media, while restricting movement of the sensor chip 302. Thus, in certain example implementations, the aperture 712 may have an opening dimension smaller than the transverse dimension of the sensor chip 302 so that the sensor chip 302 stays within the cavity defined by the inner wall portions of the second header insert 710 and/or the first header insert (such as the first header insert 702 as shown in FIG. 11).

Figure 13:
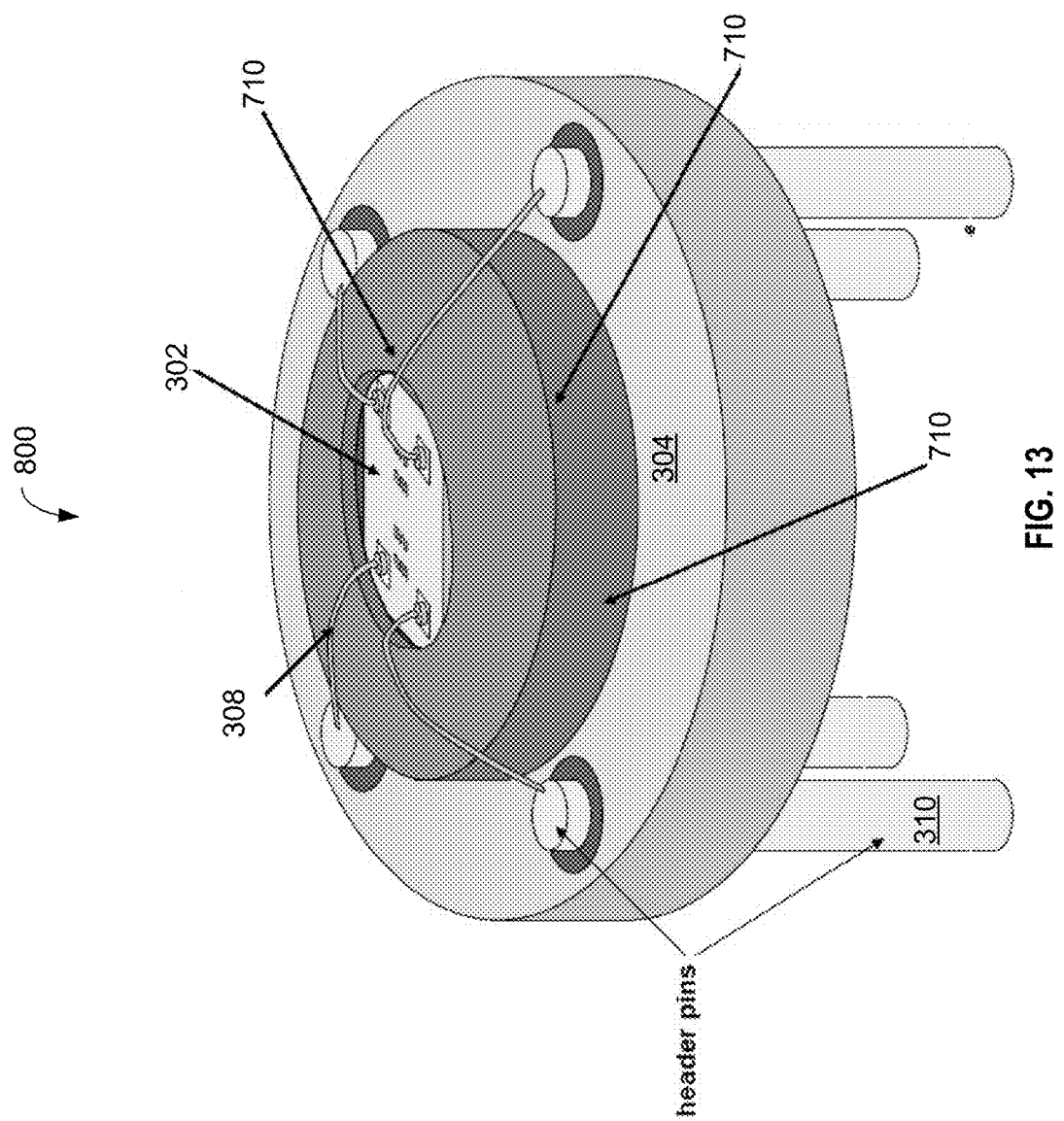
FIG. 13 is another isometric representation of the sensor assembly 700 implementation, as discussed with respect to FIGS. 10-12, and depicting an example implementation of the interconnections 308 from the sensor chip 302 to the header pins 310.

FIG. 13 is another isometric representation of the sensor assembly 700 implementation, as discussed with respect to FIGS. 10-12, and depicting an example implementation of the electrical interconnections 308 from the sensor chip 302 to the header pins 310. In accordance with an example implementation of the disclosed technology, the electrical interconnections 308 may be installed after placement of the sensor chip 302 and after inserting the second header insert 710 over the sensor chip 302 so that the wire bonding process of the electrical interconnections 308 can be done after installation of the inserts.

In accordance with an example implementation of the disclosed technology, the first header insert 502 and the second header insert 504 as shown in FIGS. 8 and 9 may be the same as the corresponding first header insert 702 and the second header insert 710, as shown and discussed above with reference to FIGS. 10-13.

In certain example implementations, the header insert may comprise a one-piece design (not shown) and may include the combination of the first header insert 702 and the second header insert 710, as discussed above, to restrict later, vertical, and/or rotational movement of the sensor chip 302. In certain example implementations, the one-piece design may be based on combining functions and structure as discussed above with respect to the first header insert 502 and the second header insert 504 of FIG. 9.

In accordance with certain example implementations of the disclosed technology, any one or all the header inserts 502 504 702 710 (or a one-piece insert) may attached to the header 304 using adhesives, glass frit bonding, and/or other appropriate methods. In accordance with an example implementation of the disclosed technology, the header inserts/stoppers do not overlap with or touch the pressure sensitive portion of the diaphragm of the pressure sensor chip 302.

As discussed above, the pressure sensor chip 302 is not attached to the header 304 or to the header inserts/stopper 502 504 702 710. For example, the pressure sensor chip 302 may be floating in oil or gas/fluid between the header 304 and the header inserts/stoppers 502 504 702 710, and can move freely, but with the travel length limited and constrained by the header 304 and by the header inserts/stoppers 502 504 702 710. The technical benefit of these features is that the pressure sensor chip has increased accuracy and stability as compared to the standard pressure sensors with adhesive mounting or glass frit mounting in the header (as discussed with respect to FIGS. 1-3) because it is not attached to any components of the header 304 or of the header inserts/stoppers 502 504 702 710, and thus it is free from mounting stress and transmitted stress related errors.

For pressure transducers with the sensor chip 302 exposed to a gaseous environment or to a fluid, the pressure sensor chip 302 may be floating and able to have restricted movement in that gaseous environment or fluid, and there may be a gap consisting of a layer of gas or fluid between the pressure sensor chip and the pressure transducer header 304. This makes the pressure sensor chip substantially free from stress influences due to mounting or from the transducer header 304, with the resulting pressure transducer being of higher accuracy and stability than standard pressure sensors that use adhesive mounting or glass frit mounting.

Figure 14:
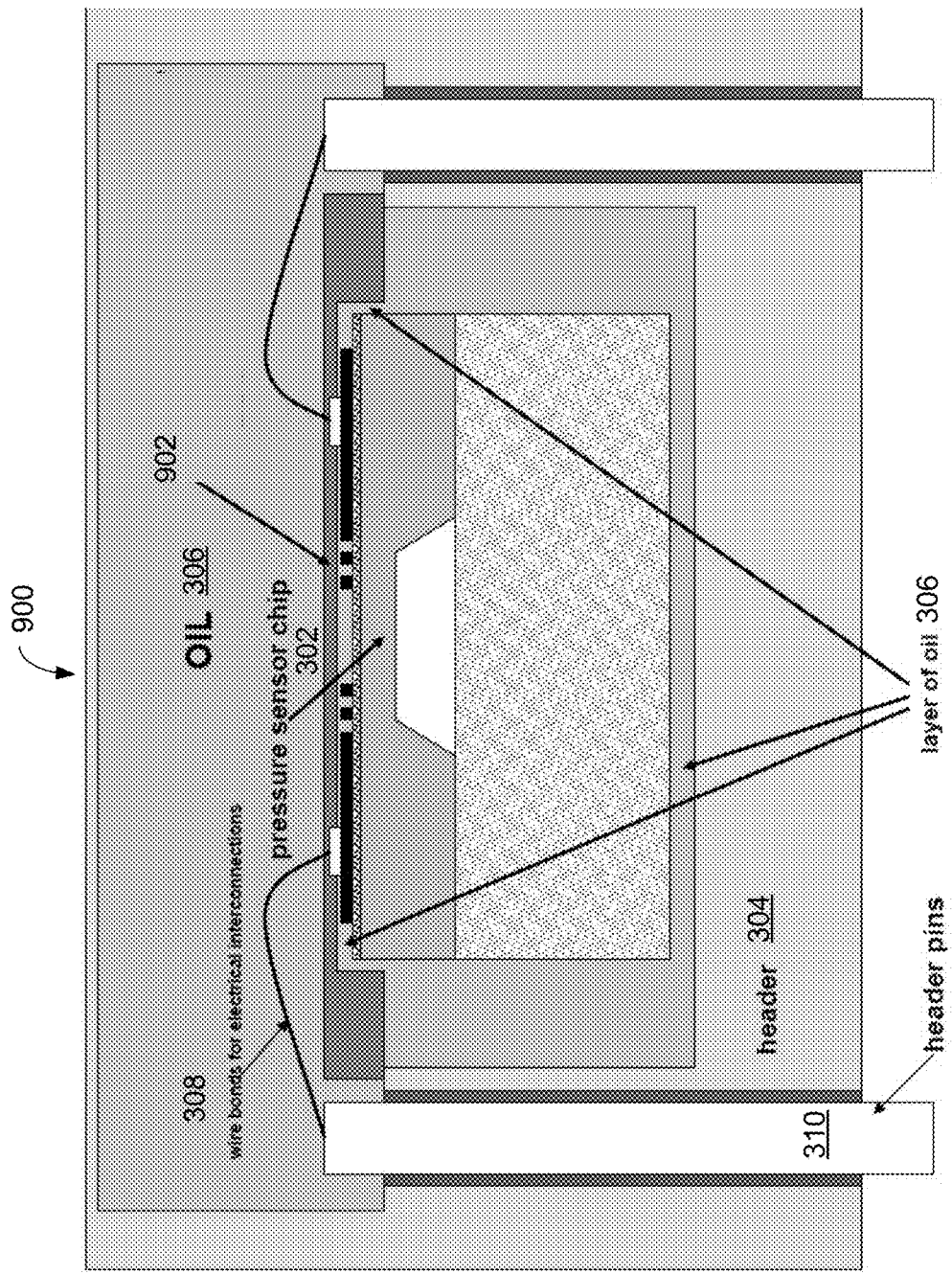
FIG. 14 depicts a cross sectional side-view of an enclosed and oil-filled sensor assembly 900, according to an example implementation of the disclosed technology.

FIG. 14 depicts a cross sectional side-view of an enclosed and oil-filled sensor assembly 900, according to an example implementation of the disclosed technology.

Figure 15:
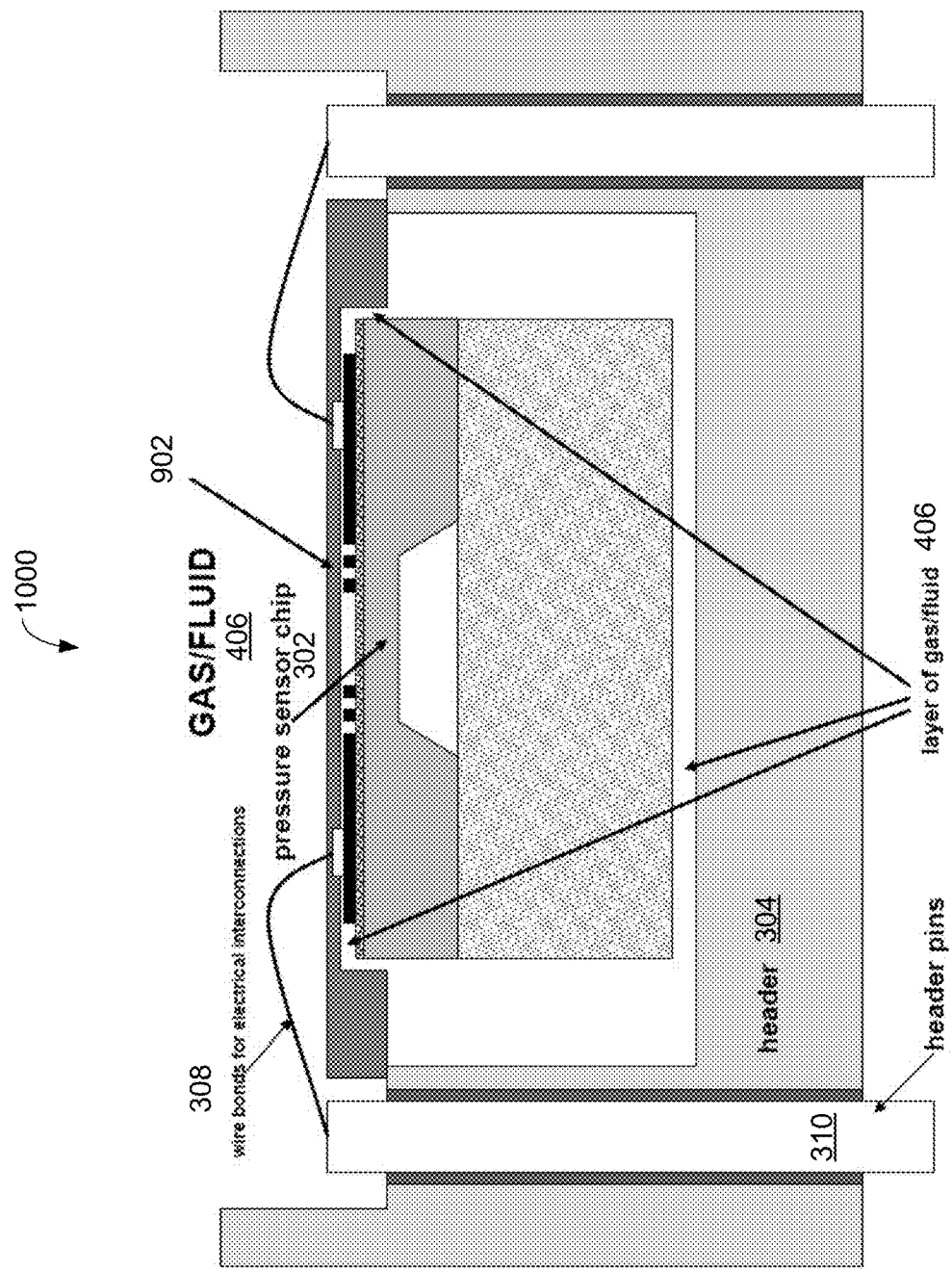
FIG. 15 depicts a cross sectional side-view of an exposed sensor assembly 1000 without oil filling, according to an example implementation of the disclosed technology.

FIG. 15 depicts a cross sectional side-view of an exposed sensor assembly 1000 without oil filling, according to an example implementation of the disclosed technology.

Figure 16:
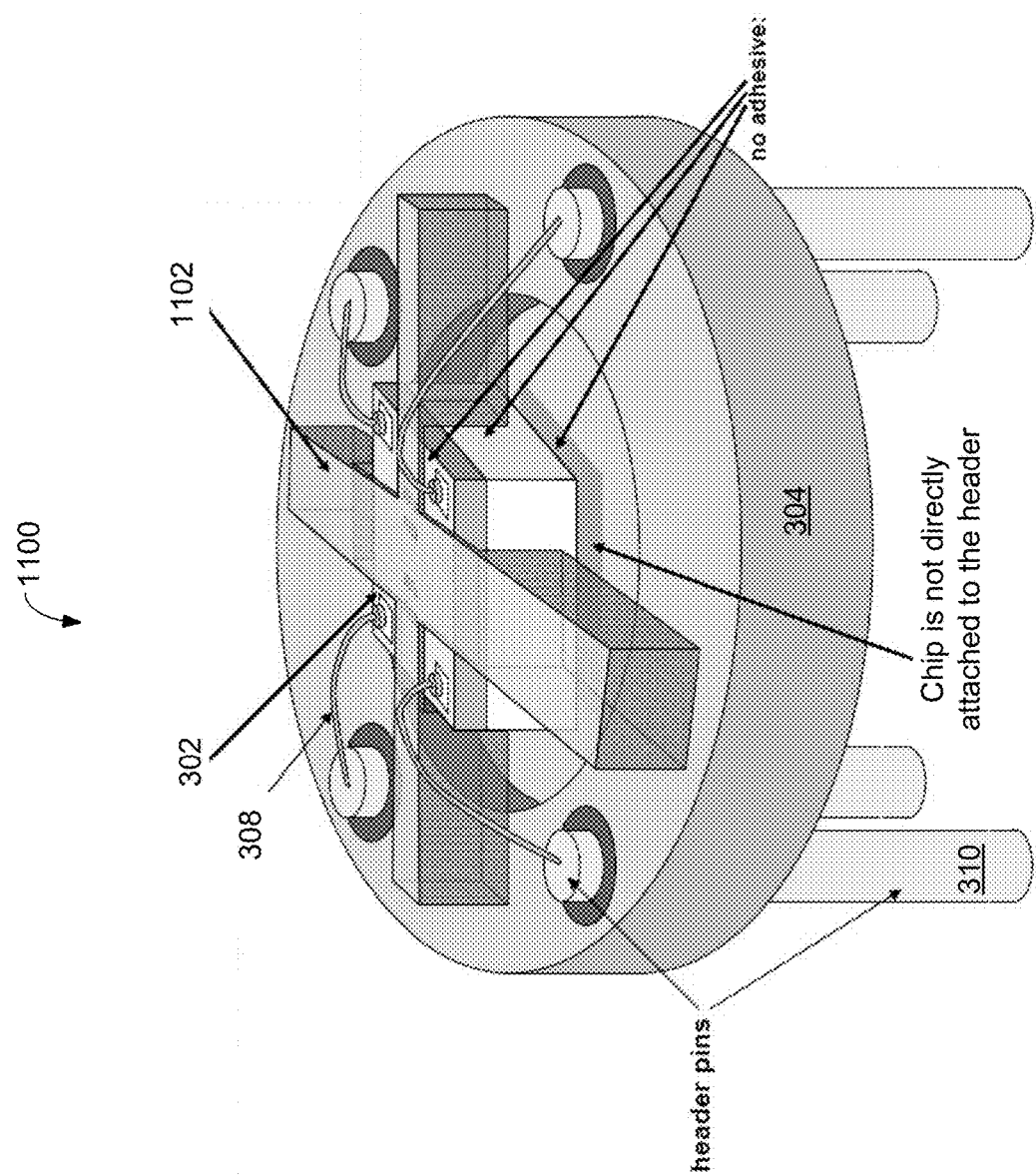
FIG. 16 is an isometric representation of the sensor assembly 1100 implementation, having a crossbeam-like header insert 1102, according to an example implementation of the disclosed technology.

FIG. 16 is an isometric representation of a sensor assembly 1100 implementation, having a crossbeam-like header insert 1102, according to an example implementation of the disclosed technology.

For the device structures shown in FIGS. 14-16, certain electrical interconnections 308 between the pressure sensor chip 302 and the header pins 310 may be made using wire bonding before or after installing the header inserts 902 1102. As previously discussed, the pressure sensor chip 302 is not rigidly attached to the header 304 or to the header inserts 902 1102. In accordance with an example implementation of the disclosed technology, the pressure sensor chip 302 may be floating in the oil 306 (FIG. 14) or in the gas/fluid 406 (FIG. 15) between the header 304 and the header inserts 902 1102, and can move freely with respect to the header 304 and to the header inserts 902 1102, but with the travel length and rotation limited and constrained by the header 304 and by the header inserts 902 1102, which may result in increased accuracy because the sensor chip 302 is not rigidly attached to any components of the header or of the header inserts 902 1102, and thus it is free from mounting stress and transmitted stress related errors.

As shown in FIGS. 14-16, the header inserts 902 1102 may provide one-piece designs to enable the pressure sensor chip 302 to freely float in oil or gas/fluid between the header 304 and the header inserts 902 1102, but with the travel length limited and constrained by the header inserts 902 1102. As discussed above, the pressure sensor chip 302 structure and a technique of installation of the header inserts 902 1102 in the header 304 may allow the sensor chip 302 to move free with respect to the transducer header 304, but with lateral, rotational, and/or vertical movement travel limited by the header inserts 902 1102. In certain example implementations, the header inserts 902 1102 may be made of glass, ceramic type materials, polymer-based materials, or other suitable materials.

In certain example implementations, the header inserts 902 1102 may be attached to the header 304 using adhesives, glass frit bonding, or other appropriate methods. In certain example implementations, the header inserts 902 1102 may be overlapping with and may be touching or coming in contact with a portion of the pressure sensitive diaphragm or the piezoresistors of the sensor chip 302. FIGS. 17-27 and the associated descriptions below provide certain additional structures and methods to allow the pressure-sensitive portion of the sensor chip 302 to be in communication with the pressure media, while keeping the inserts, etc., from touching pressure-sensitive portions of the diaphragm or piezoresistors by employing a glass cover component with a recess over the pressure-sensitive portions.

Figure 17:
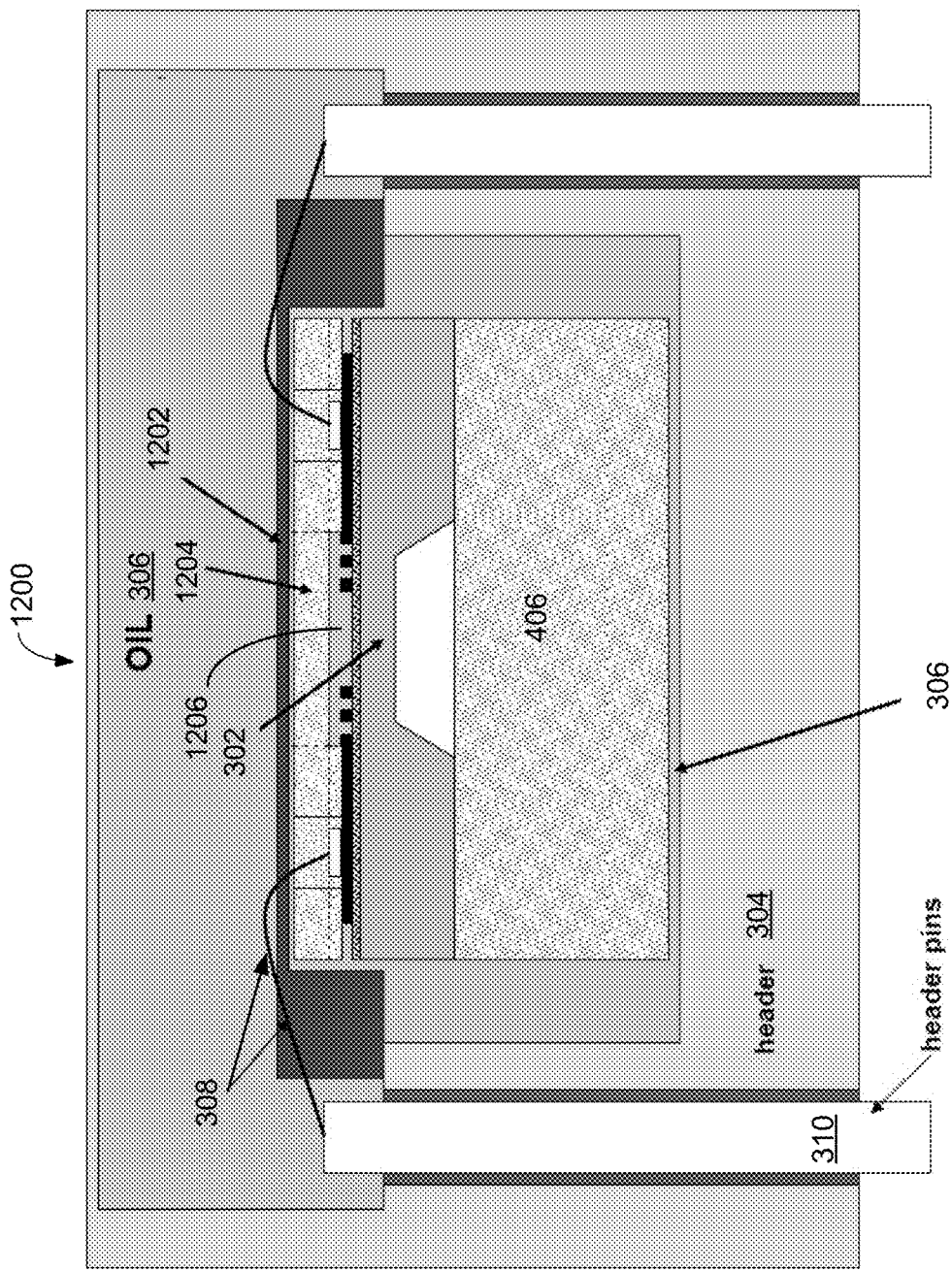
FIG. 17 depicts a cross sectional side-view of an enclosed and oil-filled sensor assembly 1200, according to an example implementation of the disclosed technology, in which a cover glass component 1204 is employed in addition to a header insert 1202.

FIG. 17 depicts a cross sectional side-view of an enclosed and oil-filled sensor assembly 1200, according to an example implementation of the disclosed technology, in which a cover glass component 1204 is employed in addition to a header insert 1202. In accordance with an example implementation of the disclosed technology, the cover glass component 1204 may be in contact with a portion of the sensor chip 302, but can include a recess 1206 to allow the pressure-sensitive portion of the sensor chip 302 to be in communication with the pressure media, while keeping the insert 1202, etc., from touching pressure-sensitive portions of the diaphragm or piezoresistors.

Figure 18:
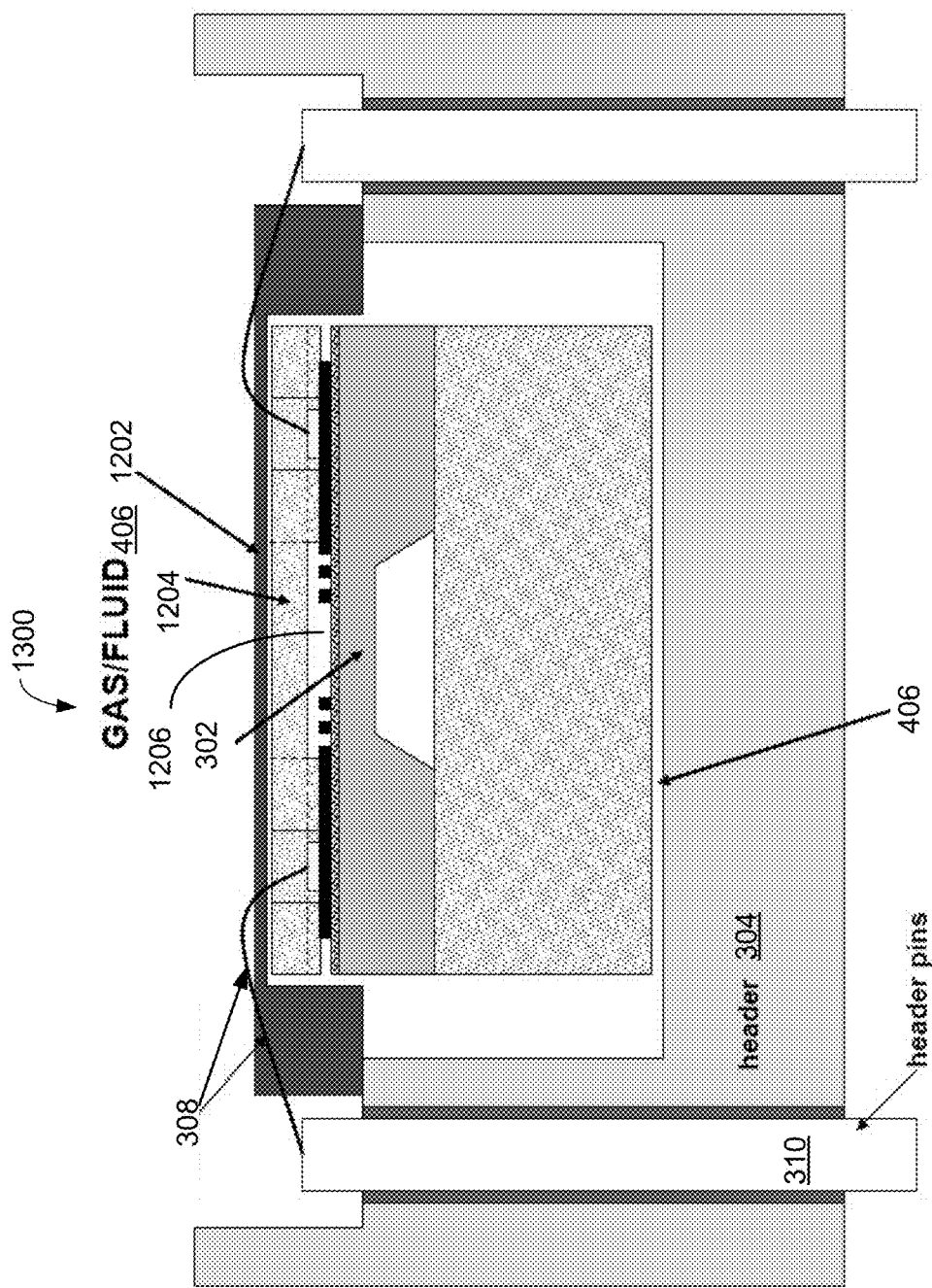
FIG. 18 depicts a cross sectional side-view of an exposed sensor assembly 1300, according to an example implementation of the disclosed technology, in which a cover glass component 1204 with a clearance recess 1206 is employed in addition to a header insert 1202.

FIG. 18 depicts a cross sectional side-view of an exposed sensor assembly 1300, according to an example implementation of the disclosed technology, in which a cover glass component 1204 with a clearance recess 1206 is employed in addition to a header insert 1202 (as described above with reference to FIG. 17).

Figure 19:
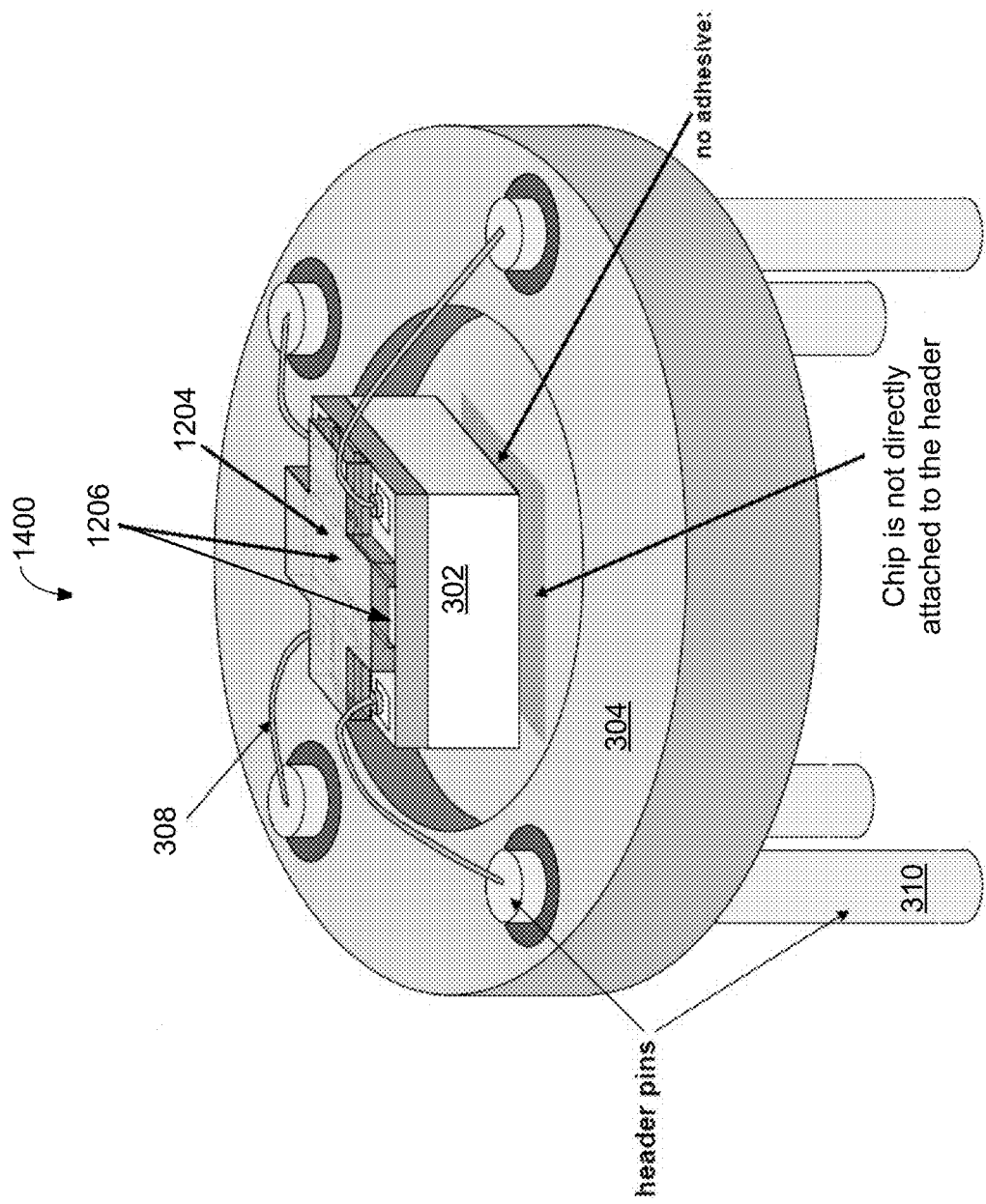
FIG. 19 is an isometric representation of a sensor assembly 1400 implementation, in which a cover glass component 1204 with a clearance recess 1206 is utilized, according to an example implementation of the disclosed technology.

FIG. 19 is an isometric representation of a sensor assembly 1400 implementation, in which the cover glass component 1204 with the clearance recess 1206 is utilized, according to an example implementation of the disclosed technology, and as describe above with respect to at least FIGS. 17-18.

Figure 20:
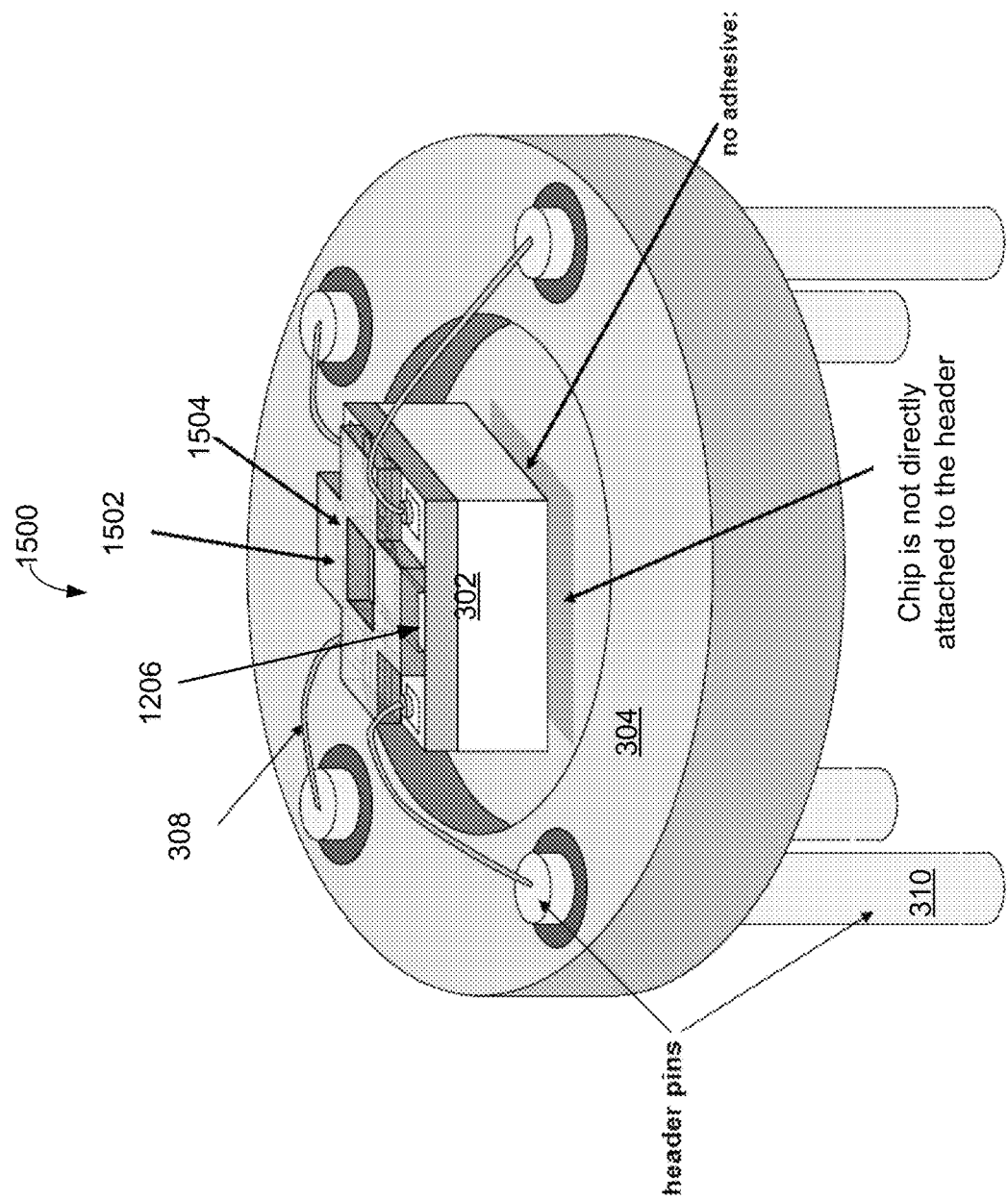
FIG. 20 is an isometric representation of a sensor assembly 1500 implementation, in which a cover glass component 1504 with a central cutout 1502 and a clearance recess 1206 is utilized, according to an example implementation of the disclosed technology.

FIG. 20 is an isometric representation of a sensor assembly 1500 implementation, in which a cover glass component 1504 with a central cutout 1502 and a clearance recess 1206 is utilized, according to an example implementation of the disclosed technology. According to an example implementation of the disclosed technology, the central cutout 1502 may allow the pressure-sensitive portion of the sensor chip 302 to be in direct communication with the pressure media, while keeping other components from touching pressure-sensitive portions of the diaphragm or piezoresistors.

Figure 21:
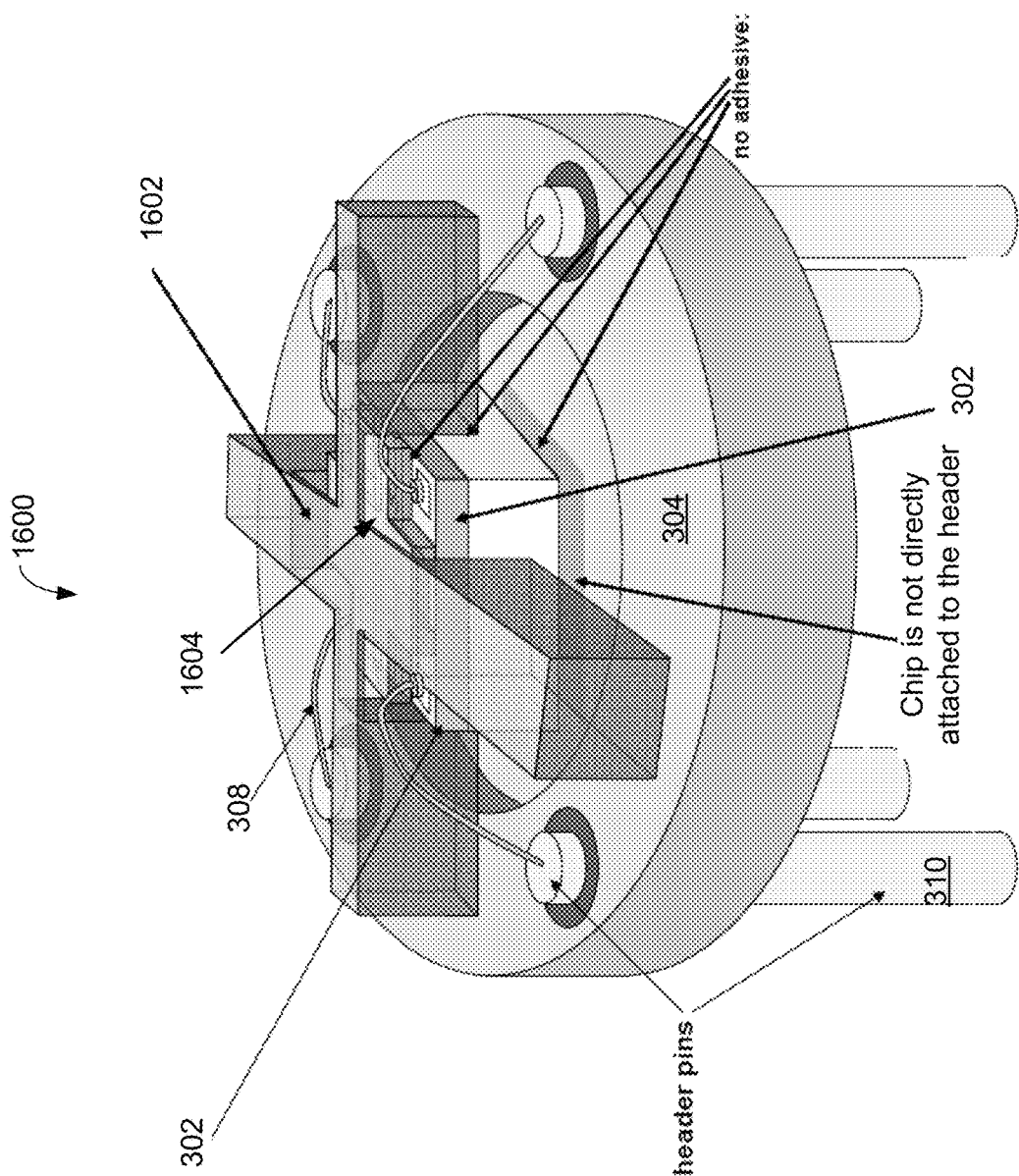
FIG. 21 is an isometric representation of a sensor assembly 1600 implementation, in which a header insert 1602 is utilized with a cover glass component 1604. The cover glass component 1604 may include a clearance recess 1206 as shown in FIG. 19, according to an example implementation of the disclosed technology.

FIG. 21 is an isometric representation of a sensor assembly 1600 implementation, in which a header insert 1602 is utilized with a cover glass component 1604. The cover glass component 1604 may include a clearance recess 1206 as shown in FIG. 19, according to an example implementation of the disclosed technology.

Figure 22:
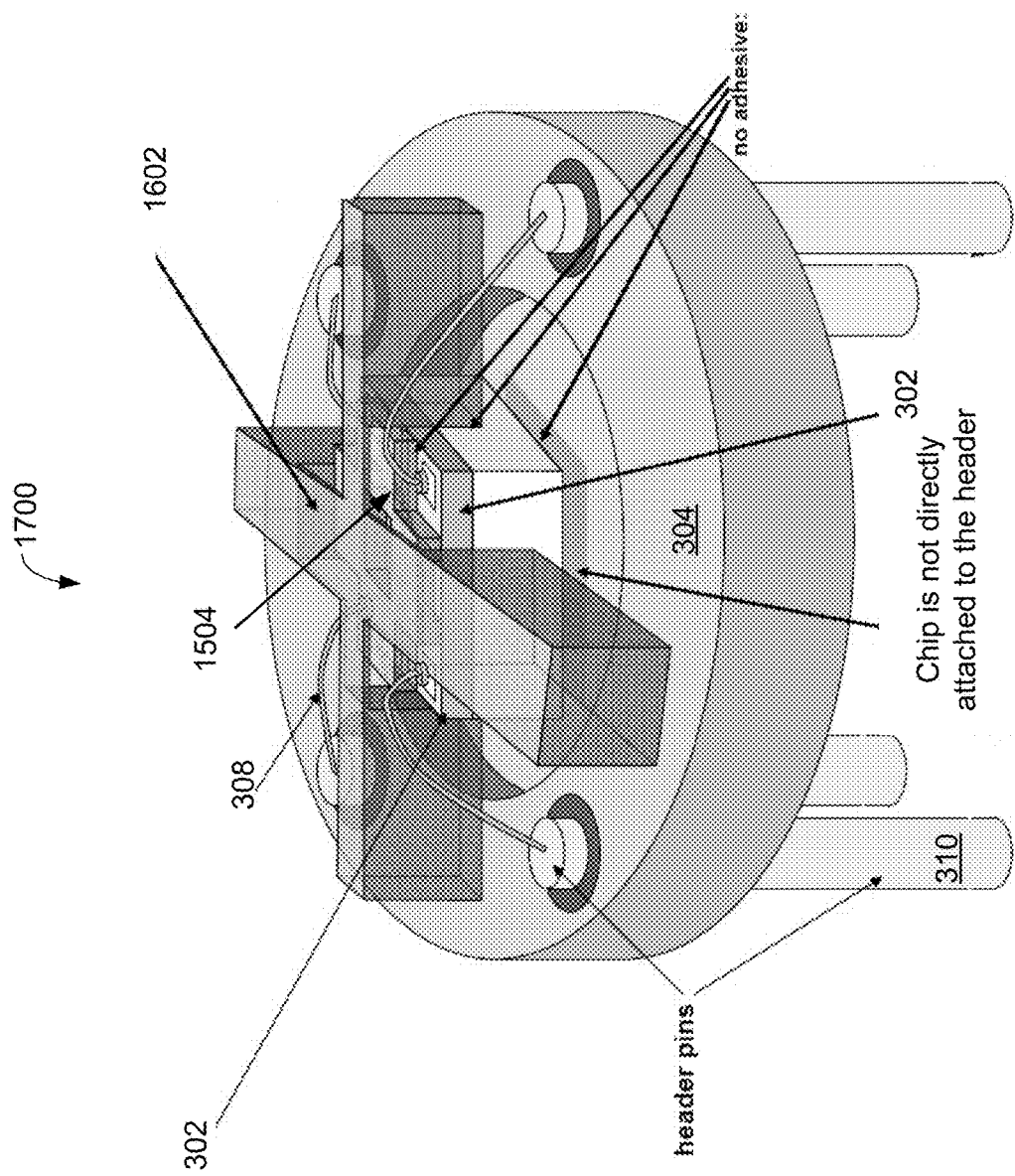
FIG. 22 is an isometric representation of a sensor assembly 1700 implementation, in which a header insert 1602 is utilized in addition to a cover glass component 1504. The cover glass component 1504 may include a central cutout 1502 and clearance recess 1206 as shown in FIG. 20, according to an example implementation of the disclosed technology.

FIG. 22 is an isometric representation of a sensor assembly 1700 implementation, in which a header insert 1602 is utilized in addition to a cover glass component 1504. The cover glass component 1504 may include a central cutout 1502 and clearance recess 1206 as shown and discussed above with reference to FIG. 20, according to an example implementation of the disclosed technology. As previously discussed, the header insert 1602 may restrict vertical movement, horizontal movement, tilt, etc., of the sensor chip 302, while allowing the sensor chip 302 to at least partially move within the cavity of the header 304 to avoid stresses.

As may be appreciated, the embodiments shown and discussed with reference to FIGS. 17-22 include device designs and installation techniques similar with that shown and discusses with reference to FIGS. 14-16, but with the device structure incorporating a cover glass component 1204 1504 1604 with a clearance recess 1206 and attached to part of the pressure sensor chip 302. One purpose of this cover glass component is to protect the pressure sensitive diaphragm portion of the sensor chip 302 and the piezoresistors, ensuring the header insert remains separated from and does not touch the pressure sensitive diaphragm portion of the sensor chip 302 and the piezoresistors.

In accordance with an example implementation of the disclosed technology, the cover glass component 1204 1504 1604 may include cavities and/or through holes for allowing interaction between the pressure sensing diaphragm, the oil (if oil filled), and the pressure measurement environment.

In accordance with an example implementation of the disclosed technology, the header insert 1602 may be attached to the header 304 using adhesives or glass frit bonding, or other appropriate methods. As previously discussed the electrical interconnections 308 between the sensor chip 305 and the header pins 310 may be made using wire bonding before or after installing the header insert 1602.

Figure 23:
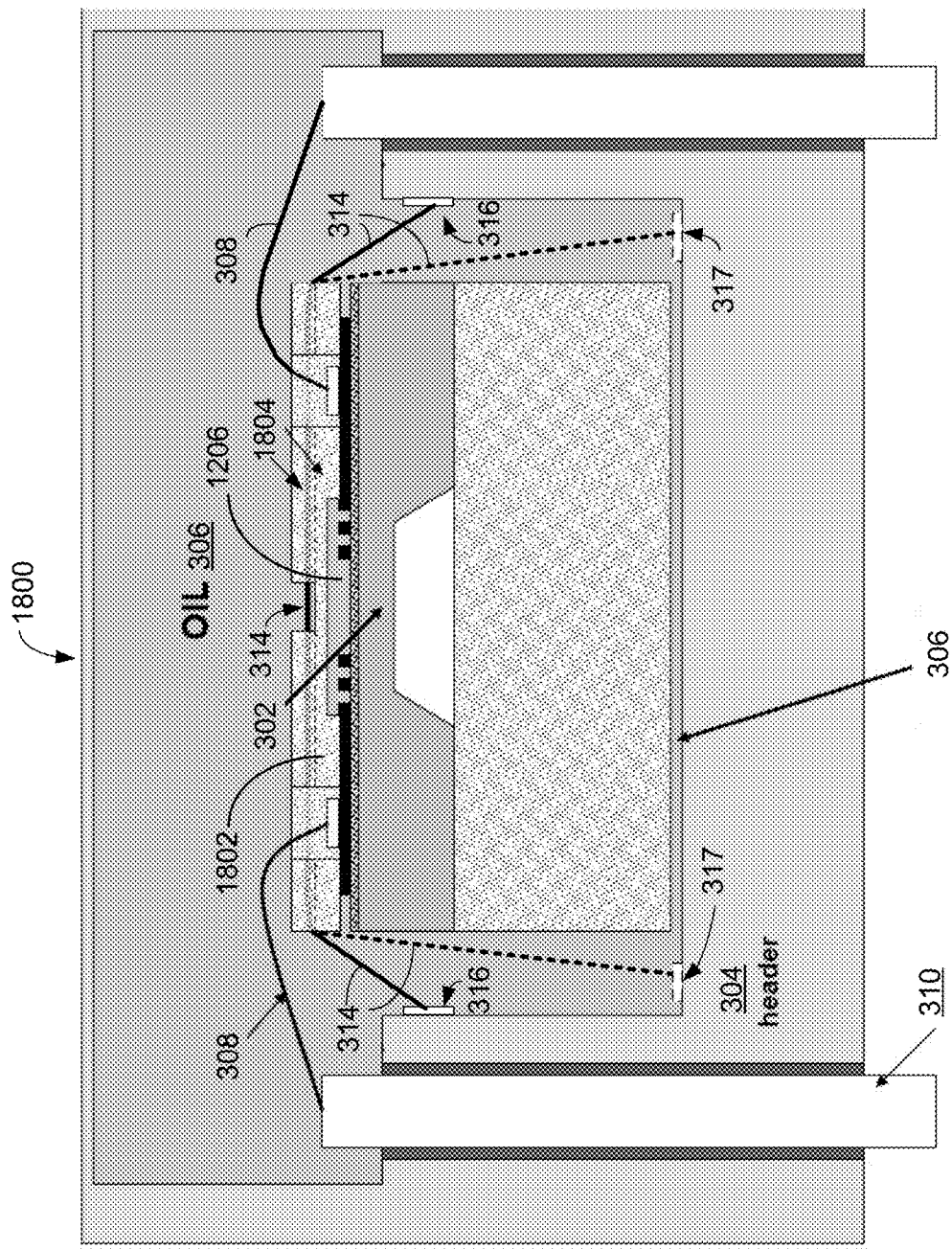
FIG. 23 depicts a cross sectional side-view of an enclosed and oil-filled sensor assembly 1800, according to an example implementation of the disclosed technology, in which a cover glass component 1802 with a clearance recess 1206 is employed, and for which the cover glass component 1802 includes grooves 1804 for retaining the anchoring tethers 314, which may be attached to the inner cavity of the header 304.

FIG. 23 depicts a cross sectional side-view of an enclosed and oil-filled sensor assembly 1800, according to an example implementation of the disclosed technology, in which a cover glass component 1802 with a clearance recess 1206 is employed, and for which the cover glass component 1802 includes grooves 1804 for retaining the anchoring tethers 314, which may be attached to the inner cavity of the header 304. In this example embodiment, connecting regions 316 317 for the anchoring tethers 314 may be disposed within an inner portion of the header 304. FIG. 23 depicts an optional configuration for attaching the anchoring tethers 314, for example to connecting regions 317 at the bottom inside portion of the header 304.

Figure 24:
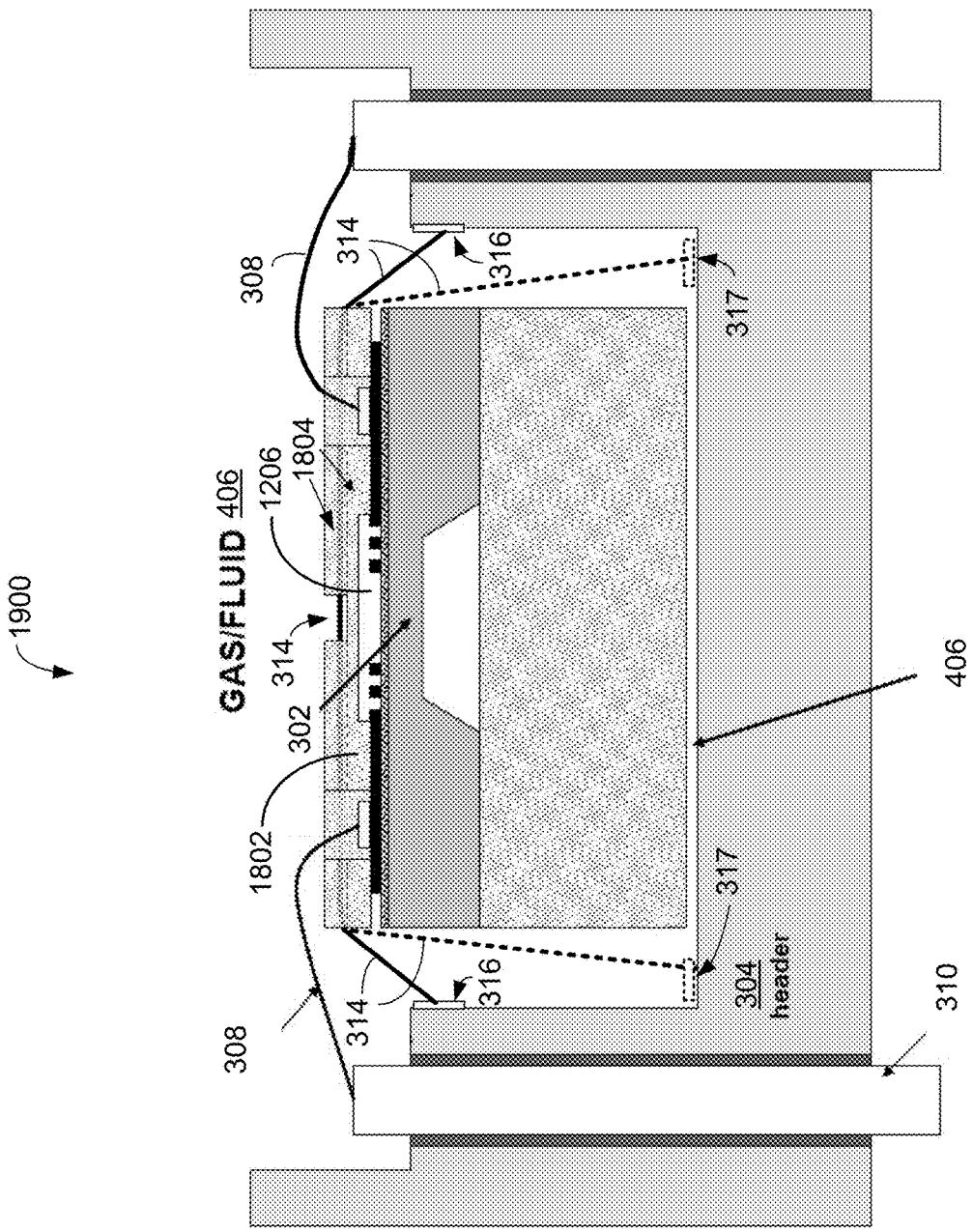
FIG. 24 depicts a cross sectional side-view of an exposed sensor assembly 1900, according to an example implementation of the disclosed technology, in which a cover glass component 1802 with a clearance recess 1206 is employed, and for which the cover glass component 1802 includes grooves 1804 for retaining the anchoring tethers 314, which may be attached to the inner cavity of the header 304.

FIG. 24 depicts a cross sectional side-view of an exposed sensor assembly 1900, according to an example implementation of the disclosed technology, in which a cover glass component 1802 with a clearance recess 1206 is employed, and for which the cover glass component 1802 includes grooves 1804 for retaining the anchoring tethers 314, which may be attached to the inner cavity of the header 304, as discussed above with reference to FIG. 23.

Figure 25:
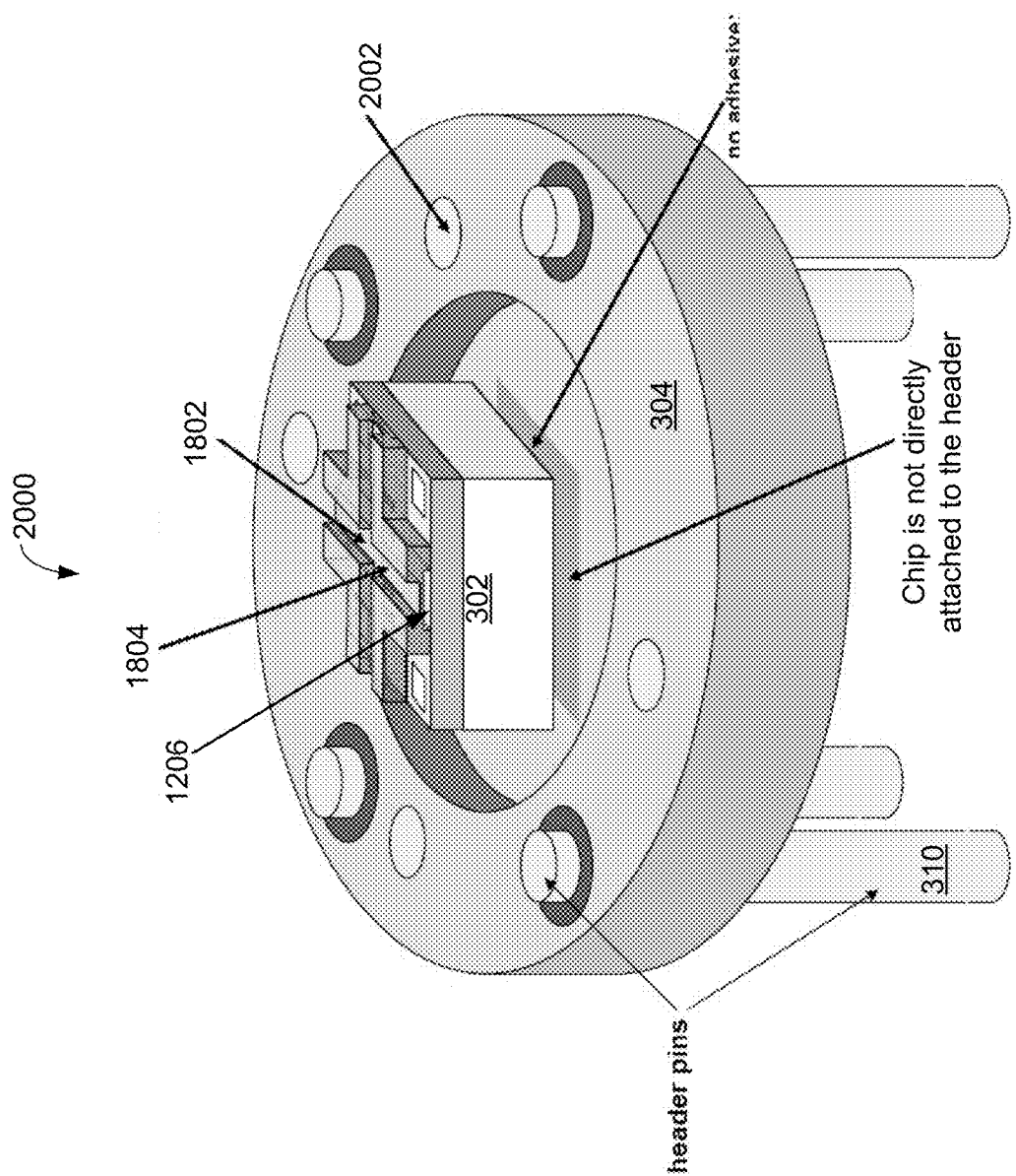
FIG. 25 is an isometric representation of a partial sensor assembly 2000 implementation, in which a cover glass component 1802 with a clearance recess 1206 is employed, and for which the cover glass component 1802 includes grooves 1804 (for retaining anchoring tethers), according to an example implementation of the disclosed technology. In this particular example embodiment, attachment points 2002 for anchoring tethers may be disposed on the top portion of the header 304.

FIG. 25 is an isometric representation of a partial sensor assembly 2000 implementation, in which a cover glass component 1802 with a clearance recess 1206 is employed, and for which the cover glass component 1802 includes grooves 1804 (for retaining anchoring tethers), according to an example implementation of the disclosed technology. In this particular example embodiment, attachment points 2002 for anchoring tethers may be disposed on the top portion of the header 304.

Figure 26:
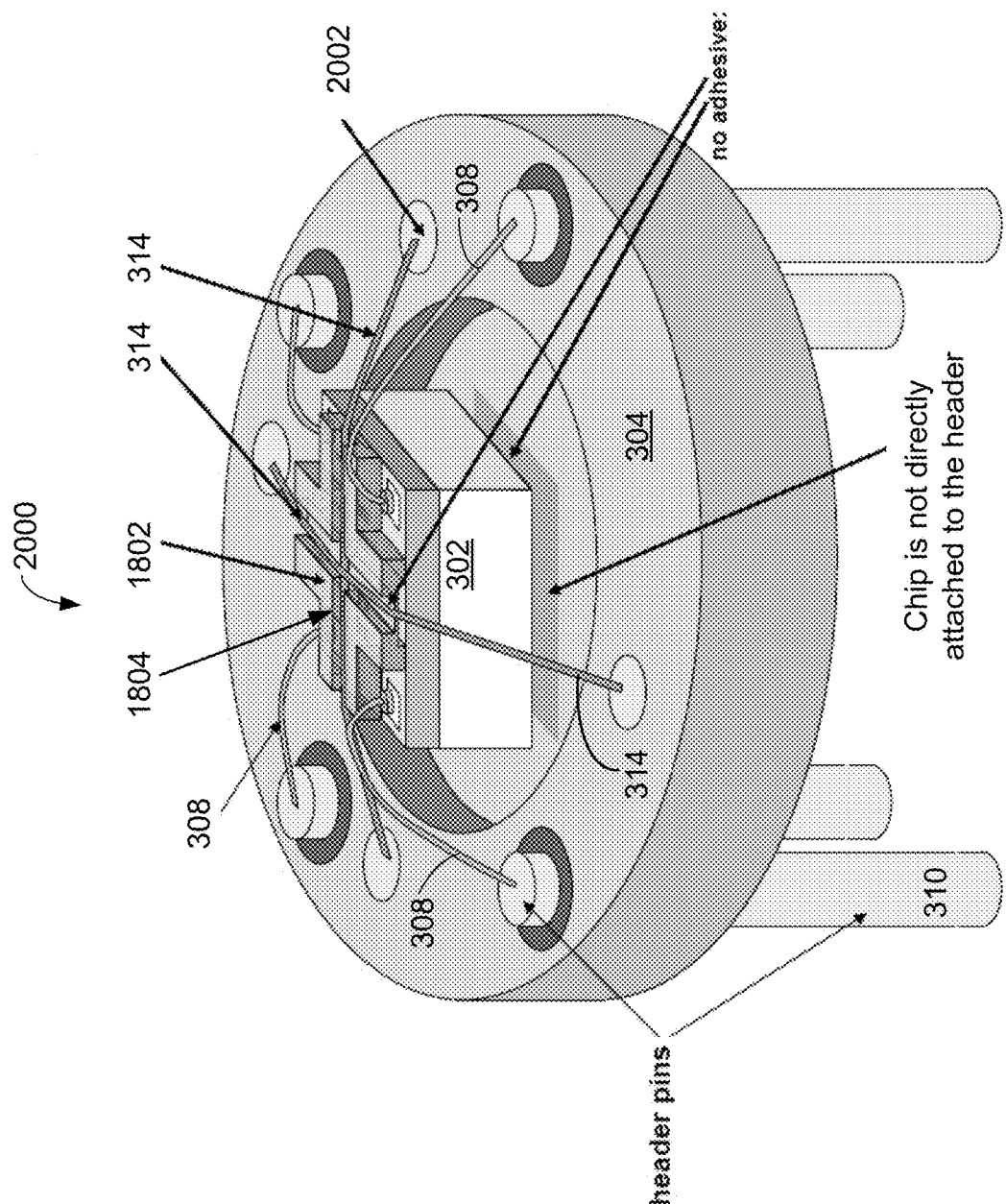
FIG. 26 is an isometric representation of a sensor assembly 2000 implementation, in which a cover glass component 1802 is employed, and for which the cover glass component 1802 includes grooves 1804 for retaining anchoring tethers 314, according to an example implementation of the disclosed technology. In this particular example embodiment, attachment points 2002 for anchoring tethers 314 may be disposed on the top portion of the header 304.

FIG. 26 is an isometric representation of a sensor assembly 2000 implementation, as discussed above with respect to FIG. 25, in which a cover glass component 1802 is employed, and for which the cover glass component 1802 includes grooves 1804 for retaining anchoring tethers 314, according to an example implementation of the disclosed technology. In this particular example embodiment, attachment points 2002 for anchoring tethers 314 may be disposed on the top portion of the header 304.

Figure 27:
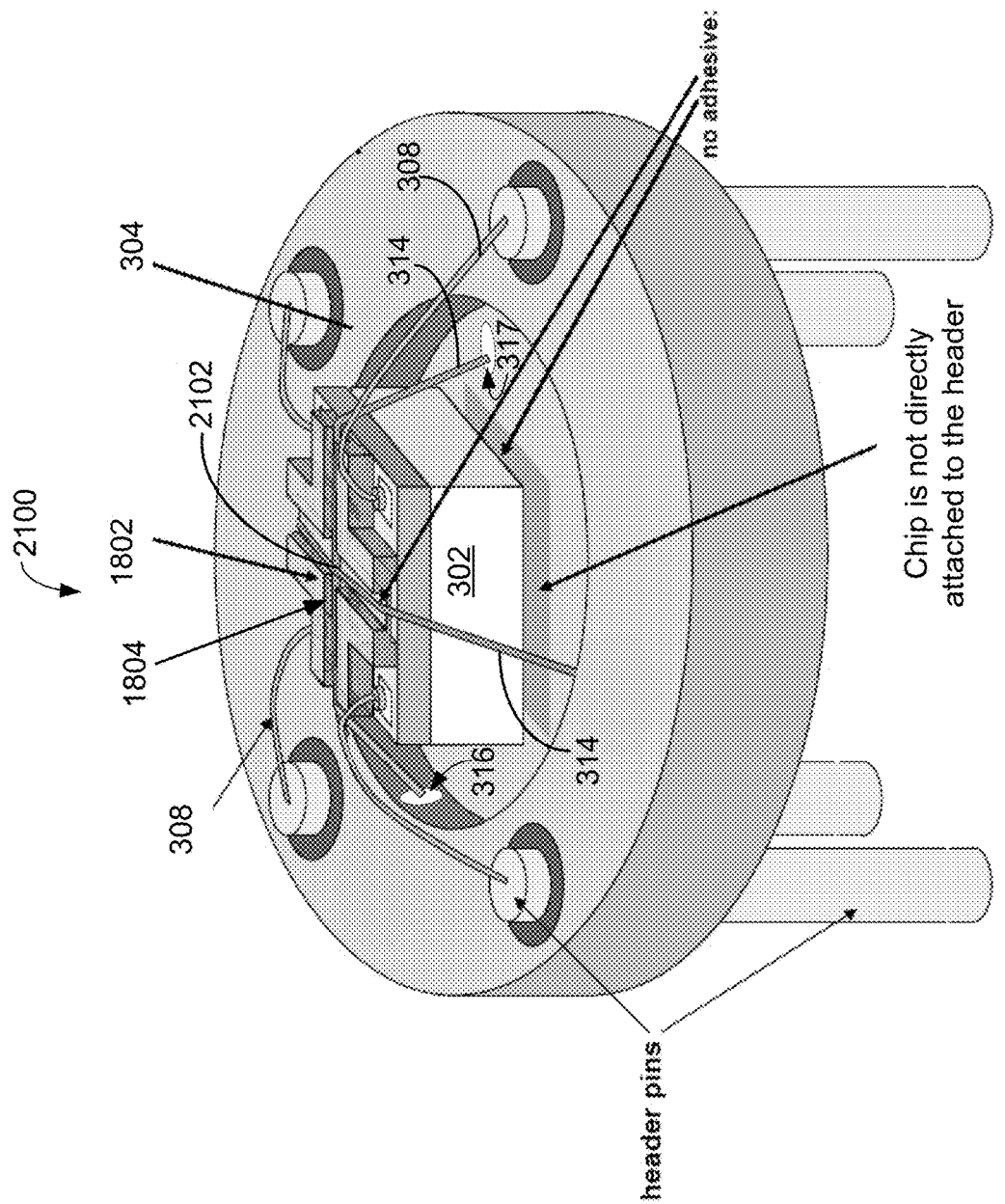
FIG. 27 is an isometric representation of a sensor assembly 2100 implementation, in which a cover glass component 1802 is employed, and for which the cover glass component 1802 includes grooves 1804 for retaining anchoring tethers 314, according to an example implementation of the disclosed technology. In this example embodiment, connecting regions 316 317 for the anchoring tethers 314 may be disposed within an inner portion of the header 304, (similar to the connection region embodiments as discussed with respect to FIGS. 4-7).

FIG. 27 is an isometric representation of a sensor assembly 2100 implementation, in which a cover glass component 1802 is employed, and for which the cover glass component 1802 includes grooves 1804 for retaining anchoring tethers 314, according to an example implementation of the disclosed technology. In this example embodiment, connecting regions 316 317 for the anchoring tethers 314 may be disposed within an inner portion of the header 304, as discussed above with reference to FIGS. 23 and 24.

In certain example implementations, the anchoring tethers 314 may cross one another at a central portion 2102, for example within the grooves 1804 of the cover glass component 1802. According to an example implementation of the disclosed technology, the anchoring tethers 314 may be bonded to each other where they cross each other. For example, the anchoring tethers 314 may be bonded to one another where they cross at this central portion 2102 using an adhesive, a glass frit, etc. In certain example implementations, the anchoring tethers 314 may be bonded to each other and to the cover glass component 1802 at a central portion 2102. In this way, the sensor chip 302 is able to freely move within certain limits, but may be constrained by the anchoring tethers 314, the interaction of the anchoring tethers 314 within the grooves 1804 and further by the bond at the central portion 2102 where the anchoring tethers 314 cross one another.

In accordance with an example implementation of the disclosed technology, the cover glass component 1802 may also include cavities and/or through holes for allowing interaction between the pressure sensing diaphragm, the oil (if oil filled) and the pressure measurement environment.

As shown an described above with reference to FIGS. 23-27, various pressure sensor assembly structures and techniques of installation allow the pressure sensor chip 302 to move freely with respect to the transducer header 304, but with the lateral, rotational, and vertical movement travel limited by mechanical stops, which may include anchoring tethers 314 placed in grooves 1804 above the sensor chip 302, and attached to the header 304, but not attached to the chip 302. In accordance with an example implementation of the disclosed technology, the assembly structures 1800-2100 may incorporate a cover glass component 1802 with grooves 1804 for accommodating the anchoring tethers. One purpose of this cover glass component 1802 is to protect the pressure sensitive diaphragm portion of the sensor chip 302 and the piezoresistors, ensuring the other components remain separated from and do not touch the pressure sensitive diaphragm portion of the sensor chip 302 and the piezoresistors. For example, the cover glass component 1802 may include a clearance recess 1206 to allow the pressure media to freely interact with the pressure sensitive portion of the sensor chip 302 while providing clearance around the pressure sensitive diaphragm portion of the sensor chip 302.

In accordance with certain example implementations, the header inserts, as discussed herein may be made of metals, glass, ceramic type materials, polymer-based materials, or other suitable materials. According to an example implementation of the disclosed technology, installation of the anchoring tethers 314 can be made using wire bonding, welding, adhesives, glass frit bonding, pick and place tools, dispensing tools, or other suitable installation techniques.

In accordance with an example implementation of the disclosed technology, the cover glass component, as disclosed herein, may have lateral holes, cavities, recesses, and/or through holes (for example, in the top side of the cover glass component), for allowing interaction between the pressure sensing diaphragm and the pressure media, and/or to facilitate oil filling the pressure sensor header, as well as for providing protection and isolation from touching other components.

Figure 28:
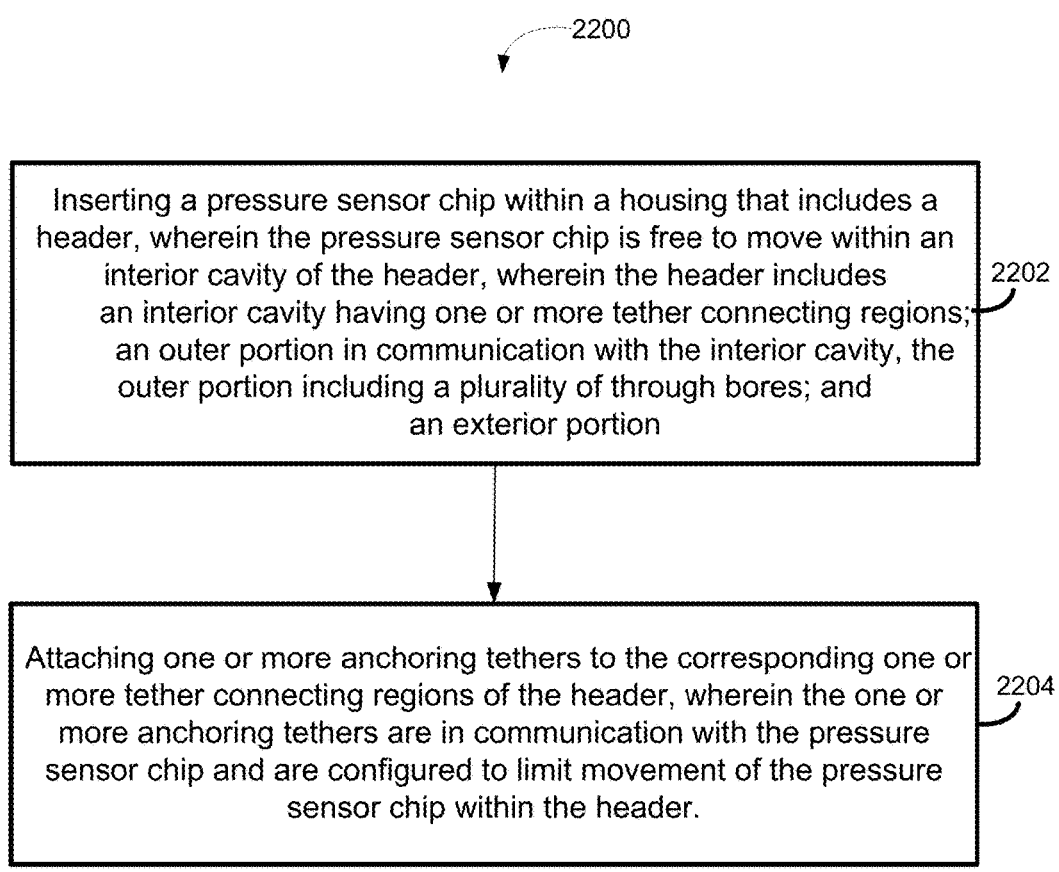
FIG. 28 is a flow diagram 2800 of a method, according to an example implementation of the disclosed technology.

FIG. 28 is a method flow diagram 2800 according to an example implementation of the disclosed technology. In block 2802, the method includes tethering a pressure sensor chip within a housing that includes a header, and wherein the pressure sensor chip is free to move within an interior cavity of the header, wherein the header includes an interior cavity having one or more tether connecting regions; an outer portion in communication with the interior cavity, the outer portion including a plurality of through bores; and an exterior portion. In block 2804, the method includes attaching one or more anchoring tethers to the corresponding one or more tether connecting regions of the header, wherein the one or more anchoring tethers are in communication with the pressure sensor chip and are configured to limit movement of the pressure sensor chip within the header.

In accordance with an example implementation, the disclosed technology can include installing a plurality of conductive header pins in the corresponding plurality of through bores. In certain example implementations, the plurality of conductive header pins may extend through the header from an external to an internal portion of the header. In certain example implementations, the header pins may be sealed to the header. In certain example implementations, the header pins may be hermetically sealed to the header.

Certain example implementations can include electrically connecting, by flexible wire, the plurality of the header pins to a corresponding plurality of bonding pads on the pressure sensor chip. In an example implementation, the plurality of bonding pads may be in electrical communication with one or more piezoresistors on the pressure sensor chip.

Certain example implementations can include attaching the one or more anchoring tethers to the pressure sensor chip at corresponding one or more connection regions on the pressure sensor chip.

According to an example implementation of the disclosed technology, the one or more anchoring tethers may be non-conductive. In certain example implementations, the anchoring tethers may be less conductive than the interconnection wires that are utilized to attach the sensor chip circuitry to the header pins. In some example implementations, the one or more anchoring tethers may be made from approximately the same material as the wire interconnections.

Certain example implementations can include installing a cover glass component in communication with the pressure sensor chip. In an example implementation, the cover glass component can include grooves configured to interface with the one or more anchoring tethers. In an example implementation, the cover glass component can include a clearance recess configured to allow pressure media to freely interact with a pressure-sensitive portion of the pressure sensor chip while providing clearance around the pressure-sensitive portion of the pressure sensor chip. In an example implementation, the cover glass component can include one or more cover glass through bores configured to allow pressure media to freely interact with a pressure-sensitive portion of the pressure sensor chip.

Certain example implementations can include installing a seal to enclose the pressure sensor chip and the interior cavity to form a sensor cavity. Certain example implementations include filling the sensor cavity with oil. Certain example implementations include sealing the sensor cavity. In certain example implementations, the oil is configured to transfer pressure from an outer portion of the sensor cavity to the pressure sensor chip.

In accordance with an example implementation of the disclosed technology, the pressure sensor chip is configure to be surrounded by the oil and to freely move within the sensor cavity with movement of the pressure sensor chip limited by the one or more anchoring tethers.

Certain example implementations include defining a clearance between the interior cavity and the pressure sensor chip to allow for at least three axes of translational movement of the pressure sensor chip relative to the interior cavity.

Certain example implementations include attaching a header insert to the header to limit movement of the pressure sensor chip It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Throughout the specification and the claims, the following terms take at least the meanings explicitly associated herein, unless the context clearly dictates otherwise. The term "connect," "connecting," and "connected" mean that one function, feature, structure, or characteristic is directly joined to or in communication with another function, feature, structure, or characteristic. The term "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive "or." Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

As disclosed herein, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

Although this disclosure describes specific examples, embodiments, and the like, certain modifications and changes may be made without departing from the scope of the disclosed technology, as set forth in the claims below. For example, although the example methods, devices and systems, described herein are in conjunction with a pressure transducer or a sensor, the skilled artisan will readily recognize that the example methods, devices or systems may be used in other methods, devices or systems and may be configured to correspond to such other example methods, devices or systems as needed. Further, while at least one example, embodiment, or the like has been presented in the detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments or examples are not intended to be construed as a critical, required, or essential feature or element of any or all of the claims.

What is claimed is:

1. A pressure sensor device comprising:
    a header, the header defining:
        an interior cavity comprising one or more tether connecting regions, wherein at least one of the one or more tether connecting regions is disposed on a header wall of the interior cavity;
        an outer portion in communication with the interior cavity, the outer portion comprising a plurality of through bores; and
        an exterior portion;
    a pressure sensor chip disposed within the interior cavity of the header; and
    one or more anchoring tethers attached to the corresponding one or more tether connecting regions;

wherein the pressure sensor chip is free to move within the interior cavity of the header, and wherein the one or more anchoring tethers are in communication with the pressure sensor chip and are configured to limit movement of the pressure sensor chip within the header.

2. The pressure sensor device of claim 1, further comprising a plurality of conductive header pins extending from the exterior portion of the header and through the corresponding plurality of through bores, and wherein the header pins are sealed to the header.

3. The pressure sensor device of claim 2, wherein the pressure sensor chip comprises a plurality of bonding pads in electrical communication with one or more piezoresistors on the pressure sensor chip, and wherein the plurality of bonding pads are electrically connected to a corresponding plurality of the header pins by flexible wire.

4. The pressure sensor device of claim 1, wherein the one or more anchoring tethers are attached to the pressure sensor chip at corresponding one or more connection regions on the pressure sensor chip.

5. The pressure sensor device of claim 1, wherein the one or more anchoring tethers are non-conductive.

6. The pressure sensor device of claim 1, further comprising a cover glass component in communication with the pressure sensor chip, the cover glass component comprising one or more of:
one or more grooves configured to interface with the one or more anchoring tethers;
a clearance recess configured to allow pressure media to freely interact with a pressure-sensitive portion of the pressure sensor chip while providing clearance around the pressure-sensitive portion of the pressure sensor chip; and
one or more cover glass through bores configured to allow pressure media to freely interact with a pressure-sensitive portion of the pressure sensor chip.

7. The pressure sensor device of claim 1, further comprising a seal that encloses the pressure sensor chip and the interior cavity to form a sensor cavity, wherein the sensor cavity is configured for sealing after being filled with an oil, and wherein the oil is configured to transfer pressure from an outer portion of the sensor cavity to the pressure sensor chip.

8. The pressure sensor device of claim 7, wherein the pressure sensor chip is configured to be surrounded by the oil and to freely move within the sensor cavity with movement of the pressure sensor chip limited by the one or more anchoring tethers.

9. The pressure sensor device of claim 1, wherein a clearance is defined between the interior cavity and the pressure sensor chip to allow for at least three axes of translational movement of the pressure sensor chip relative to the interior cavity.

10. The pressure sensor device of claim 1, further comprising a header insert attached to the header and configured to limit movement of the pressure sensor chip.

11. A method, comprising:
inserting a pressure sensor chip within a housing that includes a header, wherein the pressure sensor chip is free to move within an interior cavity of the header, and wherein the wherein the header comprises:
an interior cavity having one or more tether connecting regions, wherein at least one of the one or more tether connecting regions is disposed on a header wall of the interior cavity;
an outer portion in communication with the interior cavity, the outer portion comprising a plurality of through bores; and
an exterior portion; and
attaching one or more anchoring tethers to the corresponding one or more tether connecting regions of the header, and wherein the one or more anchoring tethers are in communication with the pressure sensor chip and are configured to limit movement of the pressure sensor chip within the header.

12. The method of claim 11, further comprising installing a plurality of conductive header pins in the corresponding plurality of through bores, the plurality of conductive header pins extending through the header, and wherein the header pins are sealed to the header.

13. The method of claim 12, further comprising electrically connecting by flexible wire, the plurality of the header pins to a corresponding plurality of bonding pads on the pressure sensor chip, the plurality of bonding pads in electrical communication with one or more piezoresistors on the pressure sensor chip.

14. The method of claim 11, further comprising attaching the one or more anchoring tethers to the pressure sensor chip at corresponding one or more connection regions on the pressure sensor chip.

15. The method of claim 11, wherein the one or more anchoring tethers are non-conductive.

16. The method of claim 11, further comprising installing a cover glass component in communication with the pressure sensor chip, the cover glass component comprising one or more of:
one or more grooves configured to interface with the one or more anchoring tethers;
a clearance recess configured to allow pressure media to freely interact with a pressure-sensitive portion of the pressure sensor chip while providing clearance around the pressure-sensitive portion of the pressure sensor chip; and
one or more cover glass through bores configured to allow pressure media to freely interact with a pressure-sensitive portion of the pressure sensor chip.

17. The method of claim 11, further comprising:
installing a seal to enclose the pressure sensor chip and the interior cavity to form a sensor cavity;
filling the sensor cavity with an oil; and
sealing the sensor cavity;
wherein the oil is configured to transfer pressure from an outer portion of the sensor cavity to the pressure sensor chip.

18. The method of claim 17, wherein the pressure sensor chip is configured to be surrounded by the oil and to freely move within the sensor cavity with movement of the pressure sensor chip limited by the one or more anchoring tethers.

19. The method of claim 11, further comprising defining a clearance between the interior cavity and the pressure sensor chip to allow for at least three axes of translational movement of the pressure sensor chip relative to the interior cavity.

20. The method of claim 11, further comprising attaching a header insert to the header to limit movement of the pressure sensor chip.

* * * * *